US012251589B2

(12) United States Patent
Dhau

(10) Patent No.: US 12,251,589 B2
(45) **Date of Patent: *Mar. 18, 2025**

(54) SYSTEM FOR EXTINGUISHING FIRES

(71) Applicant: Molekule Group, Inc., Palm Beach, FL (US)

(72) Inventor: Jaspreet S. Dhau, San Francisco, CA (US)

(73) Assignee: Molekule Group, Inc., Palm Beach Gardens, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/682,991

(22) Filed: Feb. 28, 2022

(65) Prior Publication Data

US 2022/0184442 A1 Jun. 16, 2022

Related U.S. Application Data

(63) Continuation of application No. 16/709,773, filed on Dec. 10, 2019, now Pat. No. 11,291,874.

(60) Provisional application No. 62/881,075, filed on Jul. 31, 2019, provisional application No. 62/777,489, filed on Dec. 10, 2018.

(51) Int. Cl.
*A62D 1/00* (2006.01)

(52) U.S. Cl.
CPC .......... *A62D 1/0042* (2013.01); *A62D 1/0021* (2013.01)

(58) Field of Classification Search
None
See application file for complete search history.

(56) References Cited

U.S. PATENT DOCUMENTS

| | | | | |
|---|---|---|---|---|
| 9,919,174 | B2 | 3/2018 | Vellmar | |
| 2004/0129435 | A1 | 7/2004 | Parrish | |
| 2006/0091349 | A1 | 5/2006 | Mulukutla et al. | |
| 2009/0176915 | A1 | 7/2009 | Yan et al. | |
| 2010/0200799 | A1 | 8/2010 | Mouli | |
| 2011/0073331 | A1 | 3/2011 | Xu | |
| 2012/0292551 | A1 | 11/2012 | Klaffmo | |
| 2013/0052452 | A1 | 2/2013 | Lee et al. | |
| 2013/0092865 | A1 * | 4/2013 | Carlson ................ | A62D 1/0071 977/773 |

FOREIGN PATENT DOCUMENTS

| | | | | |
|---|---|---|---|---|
| CN | 106947500 | B | | 10/2018 |
| CN | 109758711 | A | | 5/2019 |
| CN | 110433740 | A | | 11/2019 |
| KR | 20170025652 | A | * | 8/2015 |
| KR | 101718917 | B1 | | 3/2017 |
| WO | 9743012 | A1 | | 11/1997 |
| WO | 9929373 | A1 | | 6/1999 |

OTHER PUBLICATIONS

Linder, Jean-Pierre , "Imidazolium-Based Polymers via the Poly-Radziszewski Reaction", Macromolcules 2016, 49, 6, 2046-2053.
"Chemguard Specialty Chemicals and Equipment, General Foam Information", www.chemguard.com, Data Sheet #D10D0310, revision Sep. 2005.
"Fire Extinguishing Agent, Aqueous Film-Forming Foam (AFFF) Liquid Concentrate, for Fresh and Sea Water", Military Specification MIL-F-24385D, Oct. 26, 1989 with amendments.
Dlugogorski, B.Z. , et al., "What Properties Matter in Fire-Fighting Foams", National Research Institute of Fire and Diaster, Tokyo, 2002.
Level, Gaelle , et al., "Solubility Modifying Power of Zwitterionic Salts", ChemPhysChem / vol. 19, Issue 5, Dec. 20, 2017, https://onlinelibrary.wiley.com/doi/abs/10.1002/cphc.201701229.
Niedermeyer, Heiko , et al., "Mixtures of Ionic Liquids", Chem. Soc. Rev., 2012, 41, 7780-7802, 23 pages.
Rondla, Rohini , et al., "Strong Tendency of Homeotropic Alignment and Anisotropic Lithium Ion Conductivity of Sulfonate Functionalized Zwitterionic Imidazolium Ionic Liquid Crystals", Langmuir 2013, 29, 37, 11779-11785.
Taguchi, Satomi , "Design and Evaluation of Nano-Segregated lonic Liquid/Zwitterion Mixtures", Department of Biotechnology, Tokyo University of Agriculture and Technology, 2014, 79 pages.

* cited by examiner

*Primary Examiner* — Tanisha Diggs
(74) *Attorney, Agent, or Firm* — Jeffrey Schox; Randy Mehlenbacher

(57) ABSTRACT

A firefighting system can include an aqueous solution, including an ionic liquid surfactant, and an application mechanism configured to disperse the solution toward a fire.

17 Claims, 7 Drawing Sheets n - 4-26 ; X - Cl, Br ; M - Transition metal n - 4-26 n - 4-26 ; m - 1-6 ; Z - -COO, -SO3

$R_1$ - H, Alkyl chain etc. ; $R_2$ - H, Alkyl chain etc.
$R_3$ - Alkyl chain, polyethyleneglycol (PEG) chain etc.

SYSTEM FOR EXTINGUISHING FIRES

CROSS-REFERENCE TO RELATED APPLICATIONS

This application is a continuation of U.S. patent application Ser. No. 16/709,773 filed 10 Dec. 2019, which claims the benefit of U.S. Provisional Application No. 62/777,489, filed 10 Dec. 2018, and U.S. Provisional Application No. 62/881,075, filed 31 Jul. 2019, each of which is incorporated in its entirety by this reference.

STATEMENT OF GOVERNMENT SUPPORT

This invention was made with government support under Award Number WP18-L1-1597 awarded by the Strategic Environmental Research and Development Program (SERDP), Department of Defense Environment Research Program. The government has certain rights in the invention.

TECHNICAL FIELD

This invention relates generally to the firefighting field, and more specifically to a new and useful system in the firefighting field.

BACKGROUND

Aqueous film forming foams (AFFF) have wide research, defense, and industrial applications. AFFFs are used predominantly as a fire-fighting retardant to actively extinguish liquid fires and are a well-developed technology used by the US Department of Defense since the early 70's. However, the inherent toxic and non-biodegradable nature of the fluorochemicals used in AFFFs, such as—perfluoroalkyl carbonates (PFAC), perfluoroalkyl sulfonates (PFOS), and flourotelomer sulfonates (FTS)—poses a severe threat to the environment.

Thus, there is a need in the firefighting field for new and useful system for extinguishing fires. This invention provides such a new and useful system and a method of manufacture therefor.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
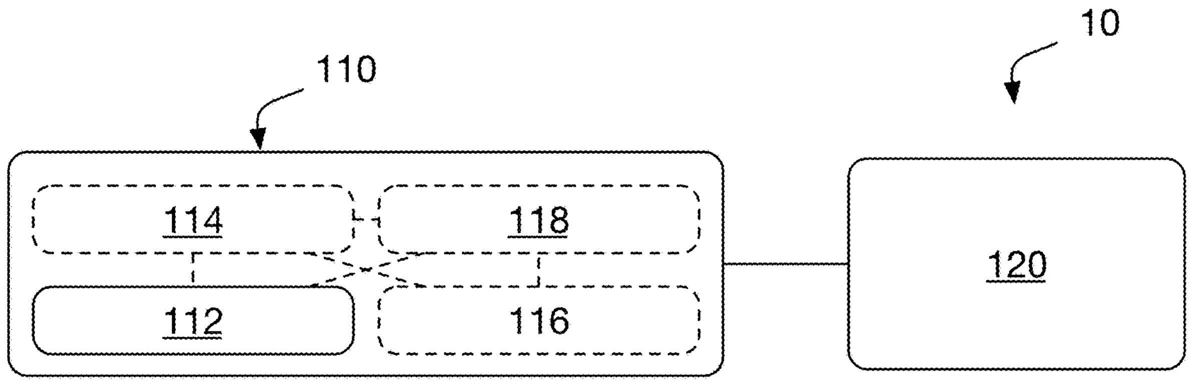
FIG. 1 is a schematic representation of the system.

The system 10 for extinguishing fires preferably includes a firefighting material 110 and an application system 120 (example shown in FIG. 1). The system can additionally or alternatively include any other suitable elements. The system functions to extinguish fires.

Figure 2:
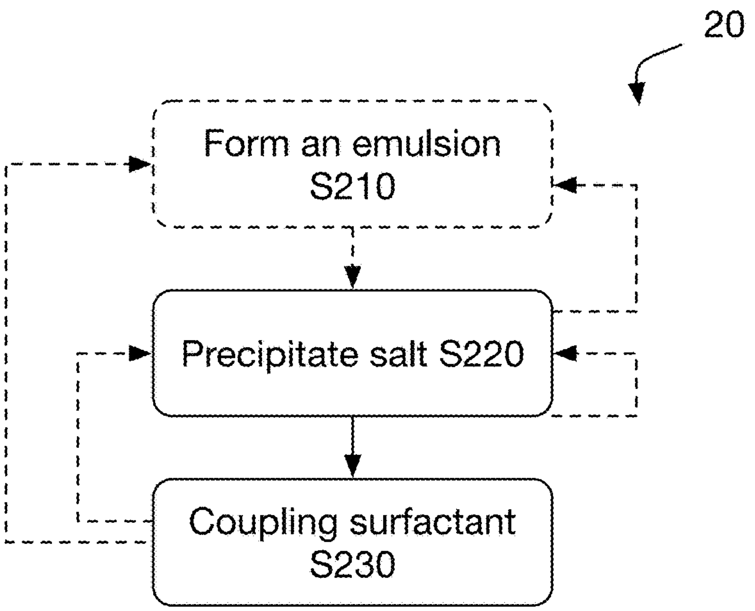
FIG. 2 is a schematic representation of an example method of manufacture of a nanoparticle.

The method of manufacture of nanoparticles 20 preferably includes precipitating salt S220 and coupling surfactant S230 (example shown in FIG. 2). The method of manufacture can additionally or alternatively include forming an emulsion S210 and/or any other suitable elements.

In variants of the system and method of manufacture, the firefighting material can be prepared on site (e.g., in advance, at the time of use, etc.), at a processing facility, and/or at any suitable location. In variants, firefighting material can be supplied to the user ready to use (e.g., loaded in the application system, diluted to the use concentration), as a concentrated solution (e.g., to be diluted and loaded by the user), and/or be prepared in any suitable manner.

2. Benefits

The system and method of manufacture can confer several benefits over conventional fire extinguishing mechanisms.

First, variants of the technology can leverages nontoxic (e.g., not known to cause damage to an organism, median lethal dosage for oral administration (oral $LD_{50}$)>1000 mg/kg body weight, median lethal dosage for dermal administration (dermal $LD_{50}$)>5000 mg/kg, median lethal concentration for inhalation ($LC_{50}$)>20 mg/L, Fish toxicity $LC_{50}$ (96 h) for Type 3>500 mg/L, etc.) and/or biodegradable materials (e.g., ionic liquids and salts) to extinguish fires. In specific examples, the salt chosen to be biodegradable or environmentally benign (e.g., salt is $MgCO_3$, which is recommended for acid soils in crop rotation) and/or to have biodegradable byproducts (e.g., MgO, which can be used as a source of Mg in Mg poor soils) and environmentally friendly surfactants and/or additives are chosen (e.g., non-fluorinated ionic liquids).

Second, variants of the technology can be used to extinguish multiple types of fires. In a specific example, the firefighting material can be used to extinguish oil fires. In variants, the byproducts from the reaction can produce a blanket of gas that smothers the fire cutting off the air supply to the fire. In variants, surfactant molecules can decrease the surface tension between the water and the oil, and thereby forming a thin film barrier removing the fuel from the fire.

Third, variants of the technology can function to provide new mechanisms for extinguishing fires. In one variant, inclusion of surfactants (for example, ionic liquid surfactants and encapsulated ionic liquid) can decrease the surface tension and/or interfacial tension of the water and/or fuel source (e.g., organic solvent) promoting thin film formation and spreading the firefighting material. In these variants, the ionic liquid can prevent the transfer of fuel from the bulk to the surface (e.g., the interface between the fuel and the firefighting material) during the application of foam (of the firefighting material). In these variants, the ionic character of the ionic liquid can repel the fuel (e.g., hydrocarbon fuel).

Fourth, variants of the technology can include materials that undergo an endothermic reaction (for example, salt decomposition) the absorbs heat from the fire. In a specific example, the firefighting material includes magnesium carbonate (e.g., $MgCO_3$), which undergoes an endothermic reaction to produce magnesium oxide and carbon dioxide ($MgCO_3 \rightarrow MgO + CO_2$, $\Delta H°$ 118 kJ/mol).

Fifth, variants of the technology can form a kinetic barrier to increase the enthalpy of reactions (e.g., vaporization, decomposition, etc.) and thereby increasing the amount of heat that the firefighting material can absorb from the fire. For example, the kinetic barrier can be formed by raising a materials inherent heat of vaporization by encapsulating the material (e.g., ionic liquid encapsulated by $MgCO_3$).

Sixth, variants of the technology can form a gas blanket that displaces the air from the fire. For example, the firefighting material can include carbonate salts (e.g., $MgCO_3$) which undergo a decomposition reaction to form a carbon dioxide gas blanket to displace air from the fire.

Seventh, variants of the technology can create a sealing barrier to diffuse flammable vapors. For example, this sealing barrier can be provided by an ionic liquid surfactant and encapsulated ionic liquid.

Eighth, variants of the technology can increase foam stability by delaying the coalescence of bubbles. For example, nanoparticles prepared by encapsulating ionic liquid with salt remain can remain trapped within the foam, thereby increasing its stability.

Ninth, variants of the technology can include self-healing film properties. For example, self-healing properties can be conferred by ionic liquid surfactant encapsulated in metal carbonates.

However, variants of the technology can confer any suitable benefits or advantages.

3. System

The system 10 for extinguishing fires preferably includes firefighting material 110 and one or more application systems 120, but can additionally or alternatively include any other suitable elements. The firefighting material can be preloaded in the application system, loaded in the application system on site, coupled to the application system (e.g., via a reservoir, via manifold, etc.), and/or interface with the application system in any suitable manner.

3.1 Firefighting Material.

The firefighting material preferably functions to provide physical and/or chemical barriers to remove fuel, heat, and/or air from fires. The firefighting material is preferably contained in the application system; however, the firefighting material can be stored in a reservoir, coupled to the application system (e.g., via a manifold), and/or any suitable manner.

Figure 8:
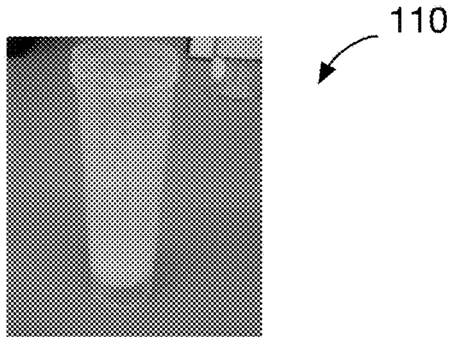
FIG. 8 is an image of an example foam formed from firefighting material.
Figure 9:
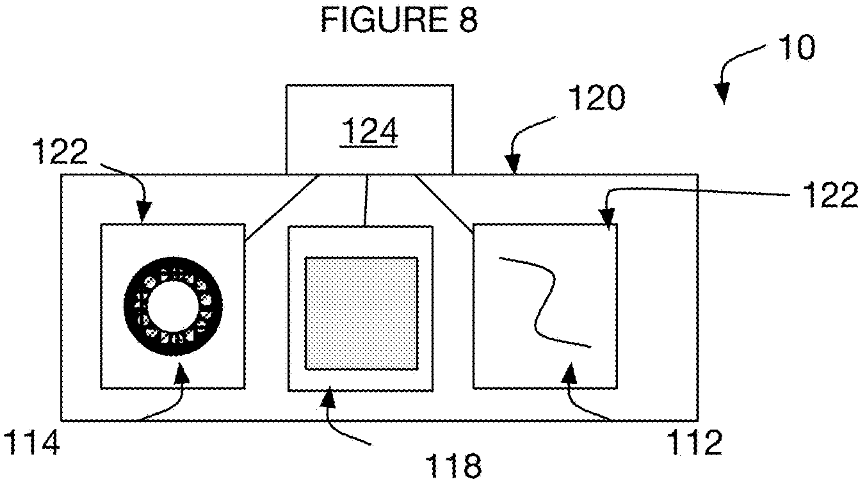
FIG. 9 is a schematic representation of an example application system.

The firefighting material is preferably foaming (e.g., forms bubbles upon agitation, example as shown in FIG. 8, etc.), but can alternatively be nonfoaming. The firefighting material is preferably nontoxic, biodegradable, and/or has low environmental availability, but additionally or alternatively can be weakly toxic, bioaccumulate, have high environmental availability, and/or have any suitable properties.

The firefighting material is preferably a mixture, more preferably a liquid mixture (e.g., a colloidal suspension, solution, etc.). However, the firefighting material can be a solid mixture (e.g., powder, crystal, glass, etc.), a heterogeneous mixture (e.g., solid such as separate solid materials; elements are in different phases of matter such as solid, liquid, gas; a colloid; etc.), a homogeneous mixture, separate materials (e.g., elements are stored separately such as to be mixed by an application system), and/or may be any suitable state of matter.

The firefighting material can include physical properties such as: concentration (e.g., by mass, by volume, by molarity, etc.) of elements (e.g., each individual element, combination of all elements, etc.), density (e.g., 0.91 g/ml, 1 g/ml, 1.03 g/ml, etc.), viscosity (e.g., to ensure good wetting of the sample, to meet specific flow parameters, specific value such as 1000 cP, etc.), specific heat (e.g., >2 J/g/° C.), spreading coefficient, surface tension, quarter life (e.g., the amount of time required for 25% of the solution to drain from the foam), biodegradability, toxicity, halogen content (e.g., fluoride content, chloride content, bromide content, iodide content), hydrogen concentration (e.g., on a logarithmic scale such as pH), refractive index, corrosion rate, burn-back time (e.g., amount of time before a fire can reignite/burn through the foam), foamability, foam expansion, foam application time (e.g., the amount of time required to extinguish a 28 $ft^2$ fire, the amount of time required to extinguish a 50 $ft^2$ fire, etc.), boiling point, melting point, freezing point, sublimation point, heat of vaporization, and/or any suitable physical properties. In specific variants, the liquid mixture is preferably Newtonian, but can additionally or alternatively be non-Newtonian (e.g., thixotropic).

The storage (and/or manufacture, transportation, etc.) concentration of the firefighting material (e.g., of surfactant, of nanoparticles, of additive(s), combinations of the above, etc. relative to the solvent) can be the same or different from the use-concentration of the firefighting material. In specific examples, the concentration of the firefighting material can be any suitable value and/or range thereof such as 0.001% to 100% such as 0.1-10% or 3-6%; however, any suitable concentration can be used.

The spreading coefficient of the firefighting material is preferably greater than 0 (e.g., at least 3), but any suitable spreading coefficient can be used. In specific examples, the spreading coefficient can be determined according to: $S_{a/b}=\gamma_b-\gamma_a-\gamma_i$, where $S_{a/b}$ is the spreading coefficient, $\gamma_b$ is the surface tension of the fuel (e.g., cyclohexane), $\gamma_a$ is the surface tension of the firefighting material, and $\gamma_i$ is the interfacial tension between the fuel and the firefighting material. The firefighting material surface tension is preferably at most 25 mN/m (such as 22-23 mN/m); however, the firefighting material can have any suitable surface tension.

The quarter life (e.g., drainage time) is preferably greater than 2.5 minutes (e.g., 3.9 minutes); however, the firefighting material can have any suitable quarter life.

The foam expansion (e.g., the ratio of the volume of the finished foam to the volume of the foam solution used to create the finished foam) is preferably at least 5; however, the firefighting material can have any suitable foam expansion. In specific examples, the foam expansion can be measured firefighting material passed through a 2 gal/min test nozzle, but the foam expansion can be measured using any suitable nozzle and/or method.

The foam application time is preferably based on the size of the fire (e.g., area of the base of the fire to be put out). However, the foam application time can be based on the type of fire (e.g., fuel), the properties of the firefighting material, and/or based on any suitable properties. In specific examples, the foam application time is preferably at most 55 s (e.g., at most 30 s); however, the firefighting material can have any suitable foam application time.

The burnback time of the firefighting material is preferably at least 200 s (e.g., at least 360 s); however, the firefighting material can have any suitable burnback time.

In examples, the biodegradability can be measured based on the chemical oxygen demand (COD) and/or the 20-day biological oxygen demand ($BOD_{20}$). In these examples, the COD is preferably at most 1000K (e.g., at most 500 K); however, the firefighting material can have any suitable COD. In these examples, $BOD_{20}$/COD ratio is preferably at least 0.65; however, the BOD20/COD ratio can be any suitable value. In a set of specific examples, the toxicity of the firefighting material can be a 50% lethal concentration (LC50) of at least 500 mg/L (in Killiefish) (e.g., at least 1000 mg/L); however, the firefighting material can have any suitable toxicity.

In specific examples, the fluoride content of the firefighting material is preferably at most 500 ppm (e.g., at most 250 ppm); however, the firefighting material can have any suitable fluoride concentration.

In specific examples, the pH of the firefighting material is preferably between 6-8.5 (e.g., between 7-8.5); however, the firefighting material can have any suitable pH.

In specific examples, the refractive index of the firefighting material is at least 1.358 (e.g., at least 1.363); however, the firefighting material can have any suitable refractive index.

The viscosity of the firefighting material at 25° C. is preferably at least 2 centistokes; however, the firefighting material can have any suitable viscosity at 25° C. The viscosity of the firefighting material at 5° C. is preferably at most 25 centistokes; however, the firefighting material can have any suitable viscosity at 5° C. (e.g., at most 20 centistokes).

In specific examples, the rate at which the firefighting material corrodes a low carbon steel is at most 1.5 milli inches/year; but the firefighting material can corrode low carbon steel at any suitable rate. In specific examples, the rate at which the firefighting material corrodes a (90-10) copper-nickel alloy is at most 1.0 milli inches/year; but the firefighting material can corrode (90-10) copper-nickel alloy at any suitable rate. In specific examples, the the rate at which the firefighting material corrodes a (70-30) nickel-copper alloy is at most 1.0 milli inches/year; but the firefighting material can corrode (70-30) nickel-copper alloy at any suitable rate. In specific examples, the rate at which the firefighting material corrodes bronze is at most 1.5 milli inches/year; but the firefighting material corrode bronze at any suitable rate. In specific examples, the firefighting material preferably does not form any pits in corrosion-resistant (CRES) steel. However, the firefighting material can generate any suitable number of and/or size pits in CRES steel.

The firefighting material preferably includes surfactant 112, but can additionally or alternatively include nanoparticles 114, additives 116, solvent 118, encapsulated material 1144, and/or any other suitable elements.

The surfactant in the firefighting material preferably functions to decrease the surface tension of the firefighting material (e.g., the solvent, the fuel, etc.), create a sealing barrier that prevents diffusion of flammable vapors, and provide a self-healing barrier. Variants of the surfactant can function to stabilize the nanosuspension (e.g., nanoparticles, nanoparticles in solution, etc.). In these variants, the surfactant preferably surrounds the nanoparticle and helps keep the nanoparticles suspended (e.g., at the oil-water interface), but can additionally or alternatively be unbound to the nanoparticle (e.g., free floating in solution, separate compound in heterogeneous mixture, etc.) and/or have any other suitable interaction with the nanoparticle.

The surfactant is preferably an ionic liquid (e.g., an ionic compound such as an anion bound to a cation that is liquid at T<100° C.). The ionic liquid can be organic or inorganic salts that exist in a liquid state at room temperature and pressure, and can include asymmetric or symmetric bulky organic or inorganic cations and/or bulky organic or inorganic anions, charged polymers, or have any other suitable composition. The ionic liquid is preferably a long chain ionic liquid (e.g., ions with long aliphatic side chains such as those containing at least six carbon atoms), but can additionally or alternatively be a short chain ionic liquid or branched chain ionic liquid (e.g., ions with short aliphatic side chains such as those containing at most six carbon atoms), a mixture thereof, or be any other suitable ionic liquid. In variants where the encapsulated material is an ionic liquid, surfactant can be the same as and/or different from the encapsulated material.

The ionic liquid is preferably selected from the class of imidazolium chlorides (e.g., substituted derivatives of imidazolium bound to halides, e.g. fluoride ($F^-$), chloride ($Cl^-$), bromide ($Br^-$), and/or iodide ($I^-$), such as: 1-butyl-3-methyl imidazolium chloride, 1-hexyl-3-methyl imidazolium chloride, 1-octyl-3-ethyl imidazolium chloride, dodecyl imidazolium chloride, dodecyl imidazolium bromide, dodecyl imidazolium iodide, 1-dodecyl 3-methylimidazolium chloride, 1-dodecyl 3-methylimidazolium bromide, 1-decyl 3-methylimidazolium chloride, 1-decyl 3-methylimidazolium bromide, tetradecylimidazolium chloride, tetradecylimidazolium bromide, 1-methyl-3-tetradecyle imidazolium chloride, 1-methyl-3-tetradecyle imidazolium bromide, hexadecylimidazolium chloride, hexadecylimidazolium bromide, 1-hexadecyl-3-methylimidazolium chloride, 1-hexadecyl-3-methylimidazolium bromide, etc.). However, the ionic liquid can be ammonium sulfates (e.g., substituted derivatives of ammonium bound to sulphate ($SO_4^{2-}$) such as tetra-alkyl ammonium sulfate) and/or any suitable class of ionic liquid. Alternatively and/or additionally, the surfactant can be biological molecules (e.g., fatty acids, cholesterol, nucleic acids, amino acids, sugars, long chain alcohols such as alcohols with C4 to C18 that are branched or unbranched and can be saturated and/or unsaturated, etc.), metallosurfactants, phosphates, polymers, salts, soaps, and/or any suitable type of compound.

In specific examples, the surfactant can include: a cation selected from the group comprising: choline,

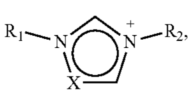, 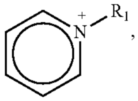, 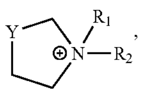,

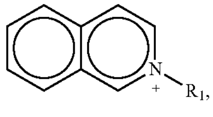, 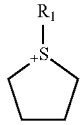, 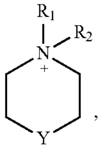, and

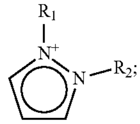;

and an anion selected from the group comprising: carbonate, sulphate, tosylate, mesylate, ethane sulphonate, besylate, closilate, camsylate, nosylate, brosylates, dansylate, sulphite, chloride, bromide, iodide, tetrachloroferrate (II), tetrachloroferrate (III), tetrachlorocuprate (II), tetrachlorozincate, tetrachlorocobalate (II), tetrachloroaluminate, $R_1$—$COO^-$,

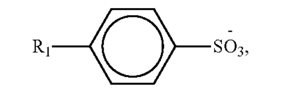

$R_1$—$OSO_3^-$; wherein: x is CH or N; y is $CH_2$, O or S; $Z^-$ is —$COO^-$, —$SO_3^-$, or —$OSO_3^-$; and $R_1$ and $R_2$ are identical or different and are each $C_1$-$C_{26}$-alkyl or $C_1$-$C_{26}$ cycloalkyl. However, the surfactant can include any suitable anion and/or cation.

In variants, the ionic liquid can include (e.g., be complexed to) one or more metal cations. In these variants, the inclusion of metal cations can yield ionic liquids that have greater oleophobicity, lipophobicity, and/or fuelphobicity (e.g., aversion to fuel source of a fire). However, the metal cations can modify the properties of the ionic liquids in any suitable manner. In specific examples, the metal ions can include one or more of: alkali metal ions ($Li^+$, $Na^+$, $K^+$, $Rb^+$, $Cs^+$), alkaline earth metal ions (beryllium ($Be^{2+}$), calcium ($Ca^{2+}$), magnesium ($Mg^{2+}$), strontium ($Sr^{2+}$), barium ($Ba^{2+}$), etc.), transition metal cations (e.g., scandium ($Sc^{3+}$), titanium ($Ti^{2+}$, $Ti^{3+}$, $Ti^{4+}$), vanadium ($V^+$, $V^{2+}$, $V^{3+}$, $V^{4+}$, $V^{5+}$), manganese ($Mn^+$, $Mn^{2+}$, $Mn^{3+}$, $Mn^{4+}$, $Mn^{5+}$, $Mn^{6+}$, $Mn^{7+}$), iron ($Fe^{2+}$, $Fe^{3+}$), cobalt ($Co^+$, $Co^{2+}$, $Co^{3+}$, $Co^{4+}$, $Co^{5+}$), nickel ($Ni^{2+}$, $Ni^{4+}$), copper ($Cu^+$, $Cu^{2+}$), zinc ($Zn^{2+}$), yttrium ($Y^{3+}$), zirconium ($Zr^{2+}$, $Zr^{3+}$, $Zr^{4+}$), niobium ($Nb^+$, $Nb^{2+}$, $Nb^{3+}$, $Nb^{4+}$, $Nb^{5+}$), molybdenum ($Mo^+$, $Mo^{2+}$, $Mo^{3+}$, $Mo^{4+}$, $Mo^{5+}$, $Mo^{6+}$), ruthenium ($Ru^+$, $Ru^{2+}$, $Ru^{3+}$, $Ru^{4+}$, $Ru^{5+}$, $Ru^{6+}$), rhodium ($Rh^+$, $Rh^{2+}$, $Rh^{3+}$, $Rh^{4+}$, $Rh^{5+}$), palladium ($Pd^{2+}$, $Pd^{4+}$), silver ($Ag^+$, $Ag^{2+}$), hafnium ($Hf^{2+}$, $Hf^{3+}$, $Hf^{4+}$), tantalum ($Ta^+$, $Ta^{2+}$, $Ta^{3+}$, $Ta^{4+}$, $Ta^{5+}$), tungsten ($W^+$, $W^{2+}$, $W^{3+}$, $W^{4+}$, $W^{5+}$, $W^{6+}$), rhenium ($Re^+$, $Re^{2+}$, $Re^{3+}$, $Re^{4+}$, $Re^{5+}$, $Re^{6+}$, $Re^{7+}$), osmium ($Os^+$, $Os^{2+}$, $Os^{3+}$, $Os^{4+}$, $Os^{5+}$, $Os^{6+}$), iridium ($Ir^+$, $Ir^{2+}$, $Ir^{3+}$, $Ir^{4+}$, $Ir^{5+}$), platinum ($Pt^{2+}$, $Pt^{4+}$), gold ($Au^+$, $Au^{3+}$), mercury ($Hg^{2+}$)), rare earth metal cations (e.g., lanthanum ($La^{3+}$), lutetium ($Lu^{3+}$), etc.), post-transition metals (e.g., bismuth ($Bi^{3+}$), aluminum ($Al^{3+}$), etc.), metalloid cations (e.g., germanium ($Ge^{2+}$), antimony ($Sb^{5+}$), etc.), combinations of metal cations (e.g., one-to-one combinations, equal mixtures, any number of suitable metals, non-equal ratios, etc.), and/or any other suitable species. The metal cation can have any suitable oxidation state (e.g., 1+, 2+, 3+, 4+, 5+, 6+, 7+, etc.). However, any suitable cation can be complexed to the ionic liquid.

The surfactant can include one or more molecules of the same or different compound(s). In variants where the surfactant includes more than one compound, the amounts of the different compounds can be the same (e.g., mass, number of molecules, volume, etc.), different (e.g., fixed ratio to one another such as based on: relative molecular weights, relative densities, relative properties, etc.; arbitrary amounts; selected to confer desired physical properties such as solubility, stability, thermal absorption, film formation, rheological properties, etc.; etc.), and/or the amount can be chosen in any suitable manner. The different compounds can be the same type of compounds (e.g., ionic liquids, biological molecules, etc.); however, the different compounds can also be from different types of compounds (e.g.; ionic liquids and biological molecules, ionic liquids and polymers, etc.) and/or be any other suitable type of compound.

The surfactant preferably can absorb a large amount of heat (e.g., high heat of vaporization, heat of decomposition, heat capacity, specific heat capacity, etc.), but can additionally or alternatively have any suitable heat absorption properties. The surfactant preferably forms a self-healing film (e.g., a film that reassembles spontaneously), but can additionally or alternatively form non-self-healing films. The surfactant preferably does not undergo a physical or chemical transformation (e.g., phase change, chemical reaction, etc.) below a critical temperature (e.g., T<300, 500, 800° C., etc.), but can additionally or alternatively undergo a physical or chemical transformation above a critical temperature (e.g., T>20, 50, 100° C., etc.), and/or undergo any other suitable physical or chemical transformation with heat. The surfactant is preferably aliphatic (e.g., both hydrophobic and hydrophilic), but can additionally or alternatively be hydrophobic, hydrophilic, lipophilic, lipophobic, oleophobic, fuelphobic, nonreactive with the fuel, or have any other suitable solubility.

In a specific example, the surfactant is 1-tetradecyl-3-methyl imidazolium chloride. In this example, 1-tetradecyl-3-methyl imidazolium chloride is chosen because it is relatively nontoxic, stabilizes the nanoparticle colloidal suspension, forms self-healing films, decreases the surface tension of water, and can create a sealing barrier to diffuse flammable vapors.

In another specific example including more than one surfactant, one of the surfactants can optionally decompose above a critical temperature (e.g., 800° C.). For example, one of the surfactants can be a carbonate ionic liquid (e.g., an ionic liquid where the anion is carbonate such as imidazolium carbonate) that can release carbon dioxide upon decomposition. The other surfactant can be 1-tetradecyl-3-methyl imidazolium chloride. When applied to the fire, the imidazolium carbonate can decompose to produce a gas blanket, while the 1-tetradecyl-3-methyl imidazolium chloride can remain in the firefighting material to stabilize the nanoparticle colloidal suspension, form a self-healing films, decrease the surface tension of water, and create a sealing barrier to diffuse flammable vapors.

The firefighting material can optionally include nanoparticles, which can function to: create a stable suspension of a salt, absorb a large amount of heat (e.g., undergo an endothermic reaction, have a high specific heat, etc.), create a kinetic barrier to increase the amount of heat absorbed (e.g., raise the enthalpy of vaporization for elements of the firefighting material), generate a blanket of gas upon heating (e.g., a blanket of $CO_2$), increase the stability of foam and/or perform any other suitable function. The nanoparticles are preferably surrounded by surfactant, but can alternatively or additionally be bare and/or possess any suitable ligand. In variants, the nanoparticle can surround one or more encapsulated materials. The nanoparticles are preferably between 1-1000 nm in spatial extent (e.g., nanoparticle size follows a normal distribution with size), and more preferably are 10-500 nm in spatial extent, but can additionally or alternatively be any suitable size.

Figure 3:
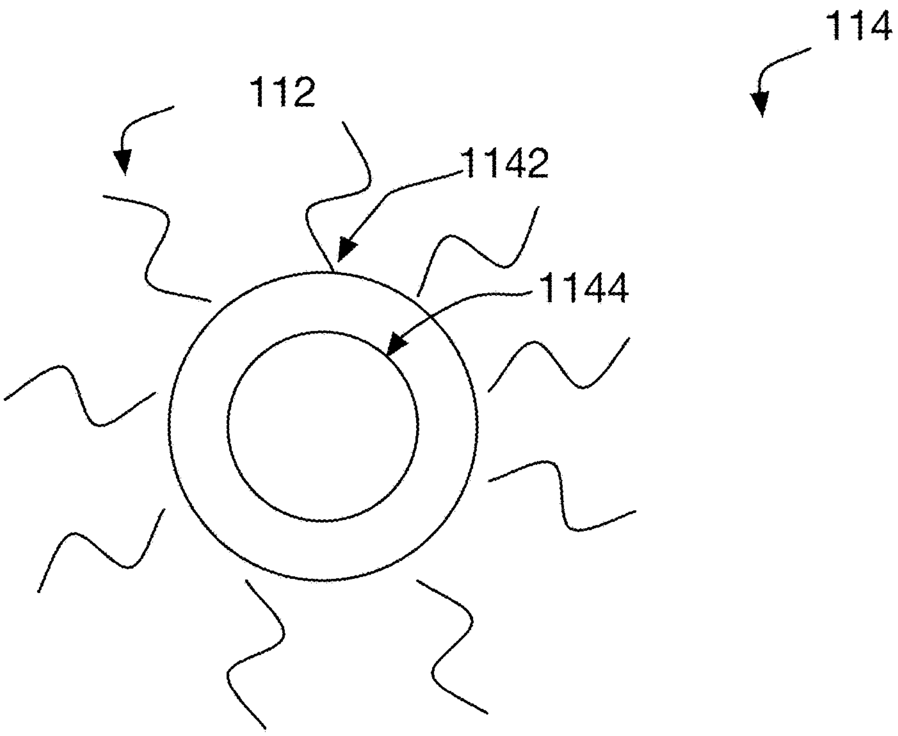
FIG. 3 is a schematic representation of an example nanoparticle with surfactant.
Figure 7:
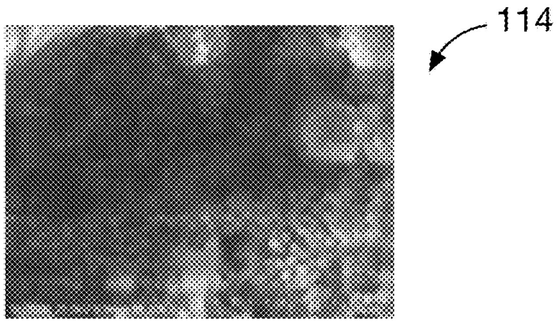
FIG. 7 is a scanning electron micrograph of a specific example of nanoparticles in a foam.

The nanoparticles are preferably spherical (for example, as shown in FIG. 7) but can additionally or alternatively be cubes, pyramids, ellipsoids, capsules, micelles, rods, tubes, stars, tetrahedrons, spherical shells, amorphous, and/or any other suitable morphology. The nanoparticles can have a symmetric and/or asymmetric structure. The nanoparticles can include one or more layers, more preferably nested layers (e.g., shells, onion structure, concentric spheres, different shapes such as a sphere surrounded by a cube, example as shown in FIG. 3, etc.), but additionally or alternatively, the layers can be adjacent, intermixed, separate, not nested, and/or have any other suitable relationship.

In a specific example, a layered nanoparticle can be hollow. In this example, a spherical layer of material (e.g., salt) can encapsulate gas (e.g., air). The hollow shell of this example can be advantageous for stabilizing the foam, stabilizing the nanoparticle colloid (e.g., extending the shelf life of the firefighting material, keeping the nanoparticles dispersed, etc.), possess a lower density than a non-hollow nanoparticle, and/or confer any other suitable set of chemical or physical properties.

In another specific example, a layered nanoparticle can have an outer shell made of a salt and an inner layer (e.g., encapsulated material) made of an ionic liquid. The outer layer in this example can form a kinetic barrier to the vaporization of the inner layer thereby increasing the enthalpy of vaporization of the inner layer and increasing the heat of vaporization of the nanoparticle relative to separate elements.

The nanoparticles in the firefighting material are preferably all the same (e.g., same composition and sizes). Alternatively or additionally, the nanoparticles can be different (e.g., different composition, different sizes, different number of layers, different layer compositions, etc.) or have any other suitable relationship between nanoparticles.

The nanoparticle material preferably includes one or more salt layers 1142. The salt layer is preferably a metal salt, but can alternatively or additionally include any other suitable salt. The salt can be a mixture of salts and/or a pure salt. The nanoparticle material can additionally or alternatively be a metal, surfactant, polymer, biological material, glass (e.g., $SiO_2$), ceramic, and/or any other suitable material. In variants of the nanoparticles possessing different layers, the different layers can have the same composition, different compositions, and/or any suitable composition. Alternatively or additionally, the nanoparticles can be a heterogeneous mixture, and/or have any other suitable composition.

The salt in the salt layer(s) is preferably weakly soluble in water (e.g., less than 1 g/L), but can additionally or alternatively have low solubility in an alternative solvent (e.g., gasoline, hexane, heptane, glycols, ethanol, ether, chloroform, diethanol amine, etc.), have a high solubility in water (e.g., at least 1 g/L), and/or have any other suitable solubility. The salt preferably has a high specific heat (e.g., greater than 4.2 kJ/kg/K); however, the salt can have any suitable specific heat. The salt preferably has a high heat of vaporization (e.g., greater than 2000 kJ/kg); however, the salt can have any suitable heat of vaporization. More preferably, the salt undergoes a transformation such as a chemical reaction (e.g., decomposition, redox, combustion, combination, displacement, etc.), but can additionally or alternatively undergo a phase change (e.g., crystal phase such as cubic to hexagonal, melting, boiling, sublimation, etc.), not undergo a transformation, and/or undergo any other suitable physical or chemical transformation.

In variants, the chemical reaction is preferably an endothermic chemical reaction (e.g., positive enthalpy of reaction), but can additionally or alternatively be kinetically limited (e.g., positive activation energy), be exothermic (e.g., negative enthalpy of reaction), and/or have any suitable reaction thermodynamics. The chemical reaction preferably occurs when the salt exceeds a critical temperature (e.g., 300° C., 500° C., 800° C., etc.) but can additionally or alternatively occur at any temperature greater than a storage (and/or transportation) temperature (e.g., above 20° C., 50° C., etc.), and/or occur at any suitable temperature. The chemical reaction preferably produces nontoxic (e.g., as defined above) byproducts. However, the byproducts can be weakly toxic (e.g., have oral $LD_{50}$ between 300-5000 mg/kg, have dermal $LD_{50}$ between 1000-5000 mg/kg, etc.), have different toxicity depending on the administration route (e.g., oral $LD_{50}$<5 mg/kg and dermal $LD_{50}$>5000 mg/kg, $LC_{50}$<0.5 mg/L and dermal $LD_{50}$>5000 mg/kg, etc.) and/or have any other suitable toxicity. The byproducts are preferably a gas and/or a metal salt, but can additionally or alternatively be any suitable material.

In variants with a metal salt byproduct, the metal salt byproduct is preferably a fertilizer compound, but additionally or alternatively can be listed as "safe" on FDA/CFSAN lists, safe for consumption, safe for exposure, etc. The metal salt byproduct is preferably weakly soluble in water, but can additionally or alternatively be water soluble. However, the metal salt byproduct can have any suitable toxicity.

In variants with a gas byproduct, the gas byproduct is preferably an inert gas (e.g., does not readily react with other species such as no reaction at pressures <1 atm; no reaction at temperatures below 800° C.; no reaction with common components of air; etc.) such as carbon dioxide ($CO_2$), nitrogen ($N_2$), etc. Alternatively or additionally, the gas byproduct can be reactive (e.g., undergoes an endothermic reaction, exothermic reaction, etc.) such as sulfur oxides (e.g., $SO_2$, $SO_3$, etc.), nitrogen oxides (e.g., $NO_2$, $NO_3$, $N_2O_5$, etc.), phosphorous oxides (e.g., $P_4O_6$, $P_2O_3$, etc.), carbon monoxide (CO), and/or any other suitable gas. The gas byproduct is preferably nontoxic (e.g., as above), but can be weakly toxic (e.g., $LG_{50}$ between 2.0 and 20), be situationally toxic (e.g., toxic when in inhaled but not when in dermal contact, etc.), and/or have any other suitable toxicity. The gas byproduct is preferably denser than air and more preferably denser than $O_2$, but can additionally or alternatively have any suitable density.

The salt preferably includes a group 2 metal cation (e.g., an alkaline earth metal such as beryllium ($Be^{2+}$), calcium ($Ca^{2+}$), magnesium ($Mg^{2+}$), strontium ($Sr^{2+}$), barium ($Ba^{2+}$), etc.), but can alternatively include transition metal cations (e.g., scandium ($Sc^{3+}$), titanium ($Ti^{2+}$, $Ti^{3+}$, $Ti^{4+}$), vanadium ($V^{+}$, $V^{2+}$, $V^{3+}$, $V^{4+}$, $V^{5+}$), manganese ($Mn^{+}$, $Mn^{2+}$, $Mn^{3+}$, $Mn^{4+}$, $Mn^{5+}$, $Mn^{6+}$, $Mn^{7+}$), iron ($Fe^{2+}$, $Fe^{3+}$), cobalt ($Co^{+}$, $Co^{2+}$, $Co^{3+}$, $Co^{4+}$, $Co^{5+}$), nickel ($Ni^{2+}$, $Ni^{4+}$), copper ($Cu^{+}$, $Cu^{2+}$), zinc ($Zn^{2+}$), yttrium ($Y^{3+}$), zirconium ($Zr^{2+}$, $Zr^{3+}$, $Zr^{4+}$), niobium ($Nb^{+}$, $Nb^{2+}$, $Nb^{3+}$, $Nb^{4+}$, $Nb^{5+}$), molybdenum ($Mo^{+}$, $Mo^{2+}$, $Mo^{3+}$, $Mo^{4+}$, $Mo^{5+}$, $Mo^{6+}$), ruthenium ($Ru^{+}$, $Ru^{2+}$, $Ru^{3+}$, $Ru^{4+}$, $Ru^{5+}$, $Ru^{6+}$), rhodium ($Rh^{+}$, $Rh^{2+}$, $Rh^{3+}$, $Rh^{4+}$, $Rh^{5+}$), palladium ($Pd^{2+}$, $Pd^{4+}$), silver ($Ag^{+}$, $Ag^{2+}$), hafnium ($Hf^{2+}$, $Hf^{3+}$, $Hf^{4+}$), tantalum ($Ta^{+}$, $Ta^{2+}$, $Ta^{3+}$, $Ta^{4+}$, $Ta^{5+}$), tungsten ($W^{+}$, $W^{2+}$, $W^{3+}$, $W^{4+}$, $W^{5+}$, $W^{6+}$), rhenium ($Re^{+}$, $Re^{2+}$, $Re^{3+}$, $Re^{4+}$, $Re^{5+}$, $Re^{6+}$, $Re^{7+}$), osmium ($Os^{+}$, $Os^{2+}$, $Os^{3+}$, $Os^{4+}$, $Os^{5+}$, $Os^{6+}$), iridium ($Ir^{+}$, $Ir^{2+}$, $Ir^{3+}$, $Ir^{4+}$, $Ir^{5+}$), platinum ($Pt^{2+}$, $Pt^{4+}$), gold ($Au^{+}$, $Au^{3+}$), mercury ($Hg^{2+}$)), rare earth metal cations (e.g., lanthanum ($La^{3+}$), lutetium ($Lu^{3+}$), etc.), post-transition metals (e.g., bismuth ($Bi^{3+}$), aluminum ($Al^{3+}$), etc.), alkali metal cations (e.g., lithium ($Li^{+}$), sodium ($Na^{+}$), potassium ($K^{+}$), etc.), metalloid cations (e.g., germanium ($Ge^{2+}$), antimony ($Sb^{5+}$), etc.), combinations of metal cations (e.g., one-to-one combinations, equal mixtures, any number of suitable metals, non-equal ratios, etc.), and/or any other suitable species. The metal cation can have any suitable oxidation state (e.g., 1+, 2+, 3+, 4+, 5+, 6+, 7+, etc.). However, the salt can include organic cations (e.g., guanidinium, imidazolium, etc.), inorganic cations (e.g., ammonium, phosphonium, etc.), and/or any other suitable cation.

The salt preferably includes a polyatomic anion, but can additionally or alternatively be a monoatomic anion (e.g., oxide, chloride, fluoride, bromide, sulfide, etc.). The polyatomic anion is preferably carbonate ($CO_3^{2-}$) but can additionally or alternatively be an inorganic anion (e.g., sulfate, sulfite, phosphate, phosphite, bicarbonate, acetate, azide, silicate, arsenate, bisulfate, bisulfate, biphosphate, biphosphate, nitrate, nitrite, etc.). However, the anion can be an organic anion (e.g., citrate, glutamate, etc.), and/or any other suitable anion.

In a specific example, the metal salt is magnesium carbonate (e.g., $MgCO_3$). Magnesium carbonate is a preferred salt because it is weakly soluble in water, undergoes an endothermic decomposition reaction ($MgCO_3$+heat→$MgO$+$CO_2$), and the byproducts of the endothermic decomposition reaction include gaseous carbon dioxide (to produce a blanket of gas to remove fuel from the fire) and magnesium oxide (MgO), which is considered safe for human consumption by the US food and drug administration. In related examples, the metal salt can additionally or alternatively include beryllium carbonate, calcium carbonate, strontium carbonate, barium carbonate, radium carbonate, scandium carbonate, titanium carbonate, vanadium carbonate, chromium carbonate, manganese carbonate, iron carbonate, cobalt carbonate, nickel carbonate, copper carbonate, zinc carbonate, and yttrium carbonate. However, any suitable metal salt(s) can be used.

Figure 4:
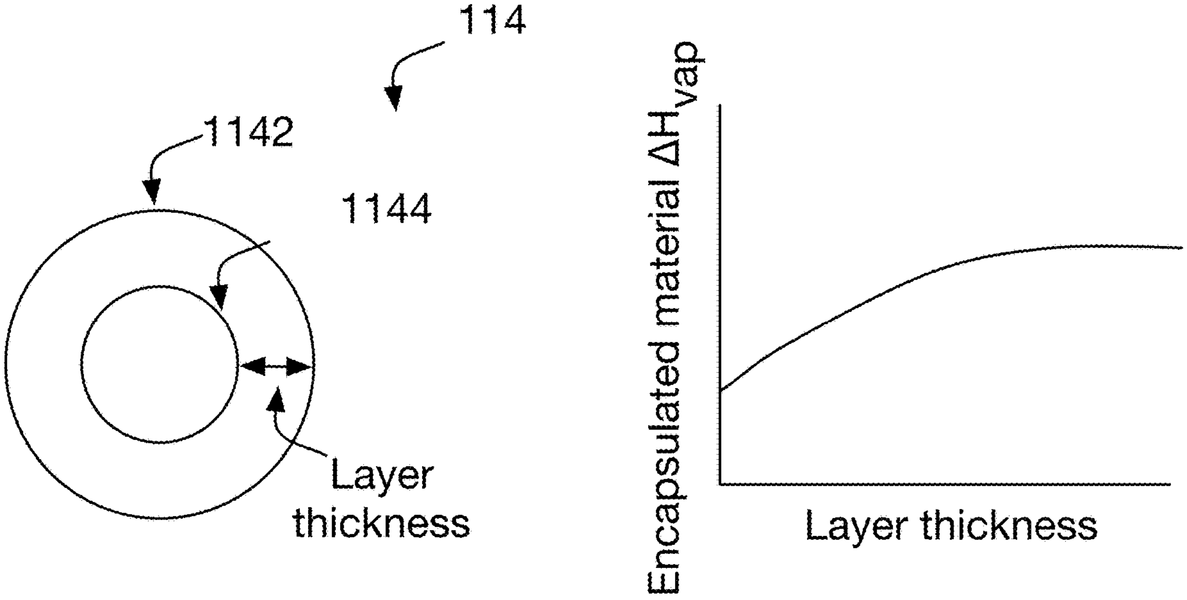
FIG. 4 is a schematic representation of an example of the increased heat of vaporization of encapsulated material relative to a salt layer thickness.

In variants with more than one layer, each nanoparticle layer preferably has a layer thickness. The layer thickness can be a set thickness (e.g., 1 nm, 2 nm, 5 nm, 10 nm, 25 nm, 50 nm, 100 nm, 150 nm, 200 nm, 250 nm, 500 nm, etc.), depend on inner layer(s) (e.g., composition, volume, etc.), depend on outer layer(s) (e.g., composition, volume, etc.), depend on adjacent layer(s) (e.g., composition, volume, etc.), depend on the desired final properties of the firefighting material (e.g., thickness set so the total nanoparticle has a target heat of vaporization, thickness set so that the heat of vaporization of the inner layer(s) increases by a fixed percentage, example as shown in FIG. 4, thickness determined by the total density of the nanoparticle, etc.), and/or the thickness can be defined in any other suitable manner. In variants including more than one layer, the layer thicknesses can be the same (e.g., same radius, same volume, etc.), different (e.g., different radii, different volumes), depend on total number of layers, depend on which layer it is (e.g., inner most layer, outer most layer, intermediate layer, etc.), depend on the layer composition (e.g., salt, surfactant, air, polymer, metal, etc.), depend on inside layers (e.g., inner most layer, adjacent inner layer, etc.), depend on outer layers (e.g., outer most layer, adjacent outer layer, etc.), depend on the desired properties of the sample (e.g., target density, target size, target heat of vaporization, target specific heat, etc.), and/or be selected in any suitable manner.

In a first embodiment, a nanoparticle can include an inner layer (e.g., encapsulated material) surrounded by a salt layer (e.g., $MgCO_3$). When the nanoparticle is heated, such as by a fire, the salt layer decomposes due to the heat. The decomposition of the salt layer leads to the release of the encapsulated material.

In a second embodiment, a nanoparticle can include an inner layer (e.g., encapsulated material) surrounded by a salt layer (e.g., $MgCO_3$). In this example, when the nanoparticle is heated, such as by a fire, the salt layer undergoes a decomposition reaction (e.g., as described above), but one or more of the byproducts retain the structure of the salt layer (e.g., MgO retains the salt layer structure). In this example, the encapsulated material can remain encapsulated (e.g., by MgO) and therefore not be released. This functionality can allow more toxic materials to be used for the encapsulated material and may facilitate clean up of this embodiment of the firefighting material.

In specific variants, the inner layer(s) (e.g., encapsulated material) preferably function to increase the heat of vaporization of the system, to impart desired physical properties to the nanoparticles, and to act as a reservoir for additional material. The encapsulated material is preferably the inner most layer in a layered nanoparticle, but can additionally or alternatively be in adjacent layers, nonadjacent layers, and/or any suitable layer within a layered nanoparticle. The encapsulated material preferably decreases the surface tension of water (e.g., a surfactant), but alternatively or additionally can be any suitable material. The encapsulated material preferably has a low vapor pressure (e.g., 100 pPa or less at 20° C.), but can additionally or alternatively have any suitable vapor pressure.

In variants, the encapsulated material is preferably an ionic liquid. However, the encapsulated material can include bioderived material (e.g., fatty acids, cholesterol, etc.), gas (e.g., air, argon, neon, $CO_2$, sulfur hexafluoride, etc.), salt, solvent (e.g., water, alcohol, ether, etc.), metal, salts, additives, and/or any other suitable material.

In a specific example, the encapsulated material can be chosen to be a gas (e.g., the nanoparticles can be hollow). Hollow nanoparticles can be chosen to decrease the nanoparticle density, increase the foam stability by delaying the coalescence of bubbles, and/or to add an additional gaseous barrier (e.g., from the encapsulated gaseous material) when the nanoparticle decomposes in heat.

In another specific example, the encapsulated material can be one or more surfactants. The surfactants can have an increased heat of vaporization as a function of the salt layer preventing the encapsulated surfactants from evaporating (e.g., creating a kinetic barrier). When the nanoparticle degrades (e.g., with heat), additional surfactant can be released functioning to decrease the surface tension of water, create a sealing barrier, and add self-healing material to the mixture. In these examples, the encapsulated surfactant can be the same and/or different from the surfactant in the firefighting material.

The weight ratio of surfactant to nanoparticles is preferably a value and/or range thereof between 200:1 to 20:1. However, any suitable weight ratio (and/or concentration) of surfactant to nanoparticles can be used. The relative amount of surfactant to nanoparticles preferably depends on the size of the nanoparticles (for example, a larger nanoparticle may require more surfactant molecules to cover the nanoparticle surface). However, the relative amount of surfactant to nanoparticles can depend on the surfactant, the nanoparticle material, the firefighting material concentration, the firefighting material physical properties (e.g., viscosity, foamability, surface tension, etc.), application system (e.g., dispensing nozzle shape, dispensing nozzle size, etc.) and/or can depend on any suitable properties.

However, additionally or alternatively, the materials included in the nanoparticles can be included in the firefighting material as solids (e.g., insoluble materials), dissolved materials (e.g., dissolved salts), and/or can be included in the firefighting material in any suitable manner.

The firefighting material optionally includes one or more additives. The additive(s) preferably function to impart desired characteristics (and/or properties) to the firefighting material, such as modify the surface tension, density, viscosity, stability, etc. The additives can function to provide corrosion inhibition, decrease the precipitation rate (e.g., of nanoparticles), stabilize the foam generated by the firefighting material, and/or modify the rheology of the firefighting material. The additive(s) are preferably an element of the firefighting material mixture, but can additionally or alternatively be bound to the nanoparticle, form a layer of the nanoparticle, be included as encapsulated material, and/or be otherwise suitably situated. The additive(s) are preferably added to the firefighting material to a concentration between 0.001% and 10% (e.g., by mass, by volume, by weight, etc.), but any suitable concentration can be used. The relative amount (e.g., concentration, mass, volume, etc.) of the surfactant to the additive can be any suitable ratio from 10:1; however, any suitable relative amount of additive to surfactant can be included. The additives can include: metallosurfactants (e.g., surfactants that incorporate one or more metal cations in the surfactant such as in the head group of the surfactant), dodecyl amine, any suitable salt of palmitic acid (e.g., magnesium palmitate, calcium palmitate, etc.), any suitable salt of stearic acid (e.g., calcium stearate, magnesium stearate, etc.), long chain metal carboxylates, salts (e.g., sodium chloride, potassium chloride, sodium bicarbonate, sodium carbonate, sodium bromide, potassium bromide, boric acid, sodium fluoride, magnesium chloride, calcium chloride, strontium chloride, sodium sulfate, etc.), polymers, surfactants (e.g., polysorbate 20 (Tween 20), polysorbate 80 (Tween 80), sorbitan monooleate (Span 80), polyethylene glycol octadecyl ether (Brij 20), polyethylene glycol dodecyl ether (Brij 35), polyethylene hexadecyl ether (Brij 58), Triton X-100, small molecules (e.g., organic molecules and/or inorganic molecules), alcohols (e.g., long-chain alcohols such as C4-C26 branched or unbranched, saturated or unsaturated alcohols, lauryl alcohol, etc.), sulfate esters (e.g., long chain sulfate esters such as C4-C26 branched or unbranched, saturated or unsaturated sulfate esters, sodium lauryl sulfate, ammonium lauryl sulfate, etc.), sulfonates (e.g., long-chain sulfonates such as C4-C26 branched or unbranched, saturated or unsaturated; alkylbenzene sulfonates such as sodium dodecylbenzene sulfonate; etc.), glycol ethers (e.g., 2-methoxyethanol, 2-ethoxyethanol, 2-propoxyethanol, 2-isopropoxyethanol, 2-butoxyethanol, 2-phenoxyethanol, 2-benzyloxyethanol, 1-methoxy-2-propanol, 2-(2-methoxyethoxy)ethanol, 2-(2-ethoxyethoxy) ethanol, 2-(2-butoxyethoxy)ethanol, dipropyleneglycol methyl ether, dimethoxyethane, diethoxyethane, dibutoxyethane, 2-methoxyethyl acetate, 2-ethoxyethyl acetate, 2-butoxyethyl acetate, 1-methoxy-2-propanol acetate), and/or any other suitable additive. In variants, including metal cations in the additive (e.g., as metallosurfactants) can make the firefighting material oleophobic and/or fuelphobic. However, metal cations can modify the firefighting material properties in any suitable manner.

In a specific variant, the additive(s) can include one or more polymer(s). In these variants, the polymers are preferably polymer ionic liquids, but can additionally or alternatively be block copolymers, biopolymers (e.g., carbohydrates, nucleic acids, proteins, etc.), polyketones, polyesters, polyolefins, conductive polymers, organic polymers, inorganic polymers, and/or any suitable polymer. In a series of specific examples of this variant, the additive(s) can include:

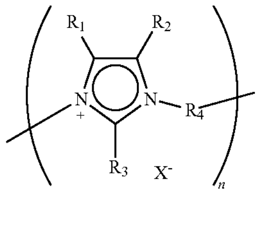

and/or

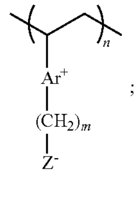

;

wherein: $R_1$, $R_2$, $R_3$, and $R_4$ are identical or different and are each C1-C26-alkyl; n is 1-10,000; m is C1-C6; X is carbonate, sulphate, chloride, bromide, iodide, tetrachloroferrate (II), tetrachloroferrate (III), tetrachlorocuprate (II), tetrachlorozincate, tetrachlorocobalate (II), tetrachloroaluminate, and/or combinations thereof; and Z is $—COO^-$, $—SO_3^-$, and/or $—OSO_3^-$. However, any suitable polymers can be used.

In a second specific variant, the additive(s) can include zwitterionic surfactants (e.g., zwitterionic salts). The zwitterionic surfactants can function to limit the amount of precipitation (e.g., of the surfactant, of the nanoparticles, etc.) of the firefighting material and/or improve the stability of the firefighting material formulation. In a series of specific examples of these variants, the zwitterionic surfactants can include:

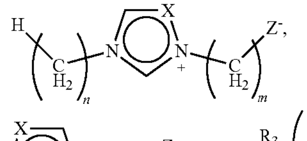

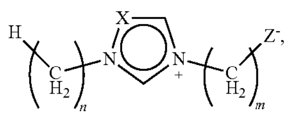

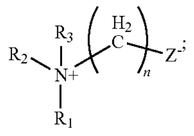

wherein n is 4-18; m is 1-4; x is CH or N; $Z^-$ is $—COO^-$, $—SO_3^-$, or $—OSO_3^-$; and $R_1$, $R_2$, and $R_3$ are identical or different and are each $C_1$-$C_{26}$-alkyl or $C_1$-$C_{26}$ cycloalkyl. However, any suitable zwitterionic surfactants can be used.

In specific variants, the additive(s) can be a preservative (e.g., protects the firefighting material from degradation such as free radical degradation, light degradation, etc.) such as: benzoates, sorbates, etc. However, the additive(s) can have any suitable chemical properties.

In specific variants, the additive(s) can be a corrosion inhibitor. In a series of specific examples, the additive(s) can include: amines (e.g., hydrazine, hexamine, phenylenediamine, dimethylethanolamine, their derivatives, etc.), antioxidants (e.g., sulfite ascorbic acid, etc.) benzotriazole, zinc dithiophosphates, antiseptics (e.g., benzalkonium chloride), and/or any suitable compound and/or class of compounds that can confer corrosion inhibition.

The firefighting material optionally includes a solvent. The solvent functions to carry the nanoparticles, surfactant, and the additive(s) and to remove heat from the fire (e.g., by evaporating). The solvent is preferably water, but can additionally or alternatively be an alcohol (e.g., ethanol, methanol, isopropanol, etc.), an ether (e.g., diethyl ether, methyl ethyl ether, etc.), an ester (e.g., ethyl acetate, triphenyl phosphate, etc.), seawater, artificial seawater, tri-methyltrimethylene glycol, hexylene glycol, a mixture of solvents (e.g., equal parts by mass, equal parts by volume, unequal amounts, azeotropic mixture, etc.), and/or any suitable solvent material.

In a specific example, the encapsulated material and surfactant are both 1-tetradecyl-3-methyl imidazolium chloride, the nanoparticle salt is $MgCO_3$, and the solvent is water. In this specific example, a $MgCO_3$ layer surrounds an inner layer (e.g., encapsulated material) of 1-tetradecyl-3-methyl imidazolium chloride. The $MgCO_3$ functions to undergo an endothermic (e.g., absorbs heat) reaction producing $CO_2$ (e.g., forming a gaseous blanket), stabilizes the formation of a foam (e.g., delaying the coalescence of bubbles), and forms a kinetic barrier around the 1-tetradecyl-3-methyl imidazolium chloride inner layer (e.g., increasing the heat of vaporization of the inner layer 1-tetradecyl-3-methyl imidazolium chloride such that the system can absorb more heat than if the material was not encapsulated). The surfactant 1-tetradecyl-3-methyl imidazolium chloride solubilizes the $MgCO_3$ nanoparticle (e.g., form a stabile colloidal suspension of $MgCO_3$ nanoparticles in the water), decreases the surface tension of the water, forms a sealing barrier (e.g., facilitates formation of film), and forms a self-healing barrier (e.g., the film that is formed will reform spontaneously).

3.2 Application System.

The application system 120 preferably functions to apply the firefighting material to a fire. The application system preferably includes one or more compartments 122 to hold the firefighting material, but alternatively or additionally can be coupled to a separate reservoir that holds the firefighting material and/or be coupled to the firefighting material in any suitable manner. The application system can be operated manually and/or automatically (e.g., in response to a sensor reading such as a temperature, smoke, etc.; responsive to a command, etc.).

The application system 120 preferably includes one or more compartments 122 to hold the firefighting material, for example as shown in FIG. 10. Individual elements of the firefighting material can be stored in a single compartment, can be stored in multiple compartments, subsets of elements of the firefighting material can be stored in separate compartments (e.g., solids stored together, liquids stored together, etc.), and/or one or more elements of the firefighting material can be stored in any suitable manner.

Figure 5A:
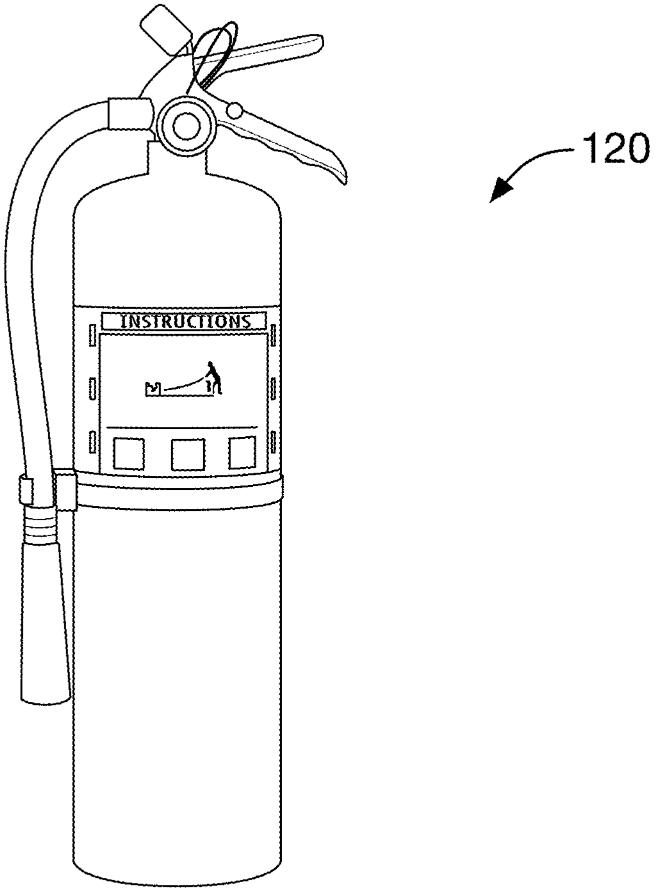
FIGS. 5*a*-5*c* are schematic representations of example application systems.
Figure 5B:
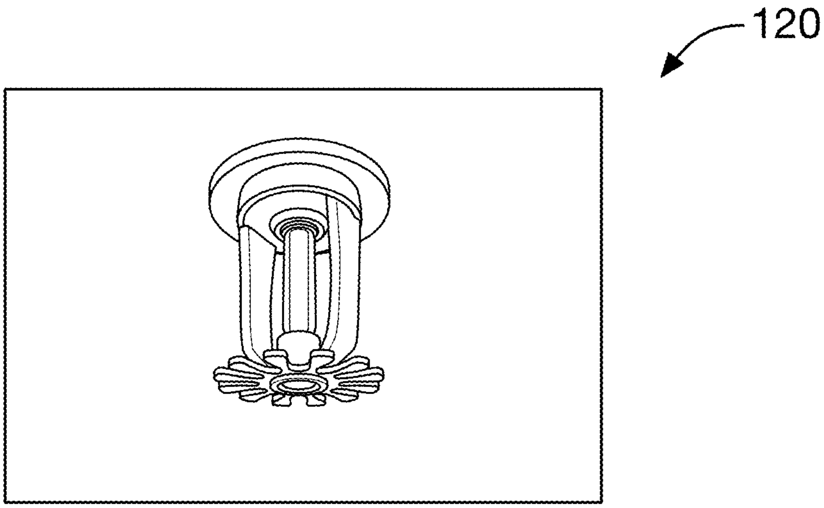
Figure 5C:
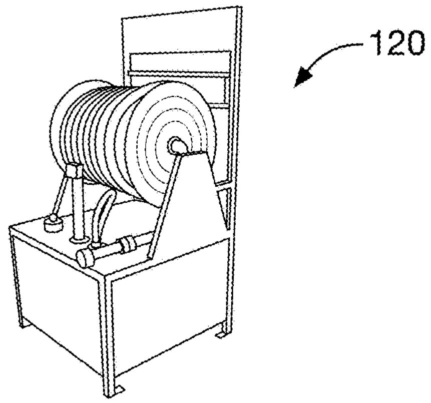

For example, as shown in FIGS. 5A-5C, the application system can be hand held (e.g., fire extinguisher), cart mounted (e.g., wheeled fire extinguishers), a container (e.g., to pour or scoop firefighting material such as solid firefighting material), a dispersal mechanism (e.g., sprinkler, fire hose, nozzle, spray, etc.) connected to a reservoir (e.g., tank, bottle, etc.), thrown on a fire (e.g., a fire ball such as the Elide Fire®) and/or any other suitable mechanism.

The application system optionally includes a propellant. The propellant preferably functions to eject the firefighting material from the application system into a fire. The propellant is preferably stored in a separate compartment from the firefighting material, but can additionally or alternatively be stored in the same compartment. The propellant is preferably an inert gas (e.g., $CO_2$, $N_2$, Ar, etc.) near standard temperatures and pressures (e.g., 20° C. and 1 atm) and a liquid at high pressures (e.g., greater than 1 atm at 20° C.). However, the propellant can be any suitable material. Additionally or alternatively, the application system can be pressurized (e.g., to a pressure greater than 1 atm), and/or the application system can be configured to expel the firefighting material in any suitable manner.

The application system optionally includes an expulsion mechanism. The expulsion mechanism preferably functions to expel and direct the firefighting material onto a fire. The expulsion mechanism can be flexibly mounted to the application system, rigidly mounted to the application system, and/or mounted in any suitable manner. The expulsion mechanism can expel the firefighting material in a jet, a collimated stream, spread the firefighting material, and/or expel the firefighting material in any suitable manner. In a series of examples, the expulsion mechanism can be a nozzle, hole, faucet, and/or can be any suitable mechanism.

The application system optionally includes a control mechanism. The control mechanism can function to control the release of the firefighting material from the application system. The control mechanism can be manually and/or automatically operated. In a series of examples, the control mechanism can be a valve, a threaded pathway, an auger, and/or any suitable component.

In variants, the application system optionally includes a mixer 124. The mixer preferably functions to mix the elements (e.g., surfactant, nanoparticle, additive, etc.) before applying the firefighting material to the fire. In some variants, the mixer can be part of the nozzle. The mixer can optionally include a diluter. The diluter functions to add an amount of solvent to the firefighting material to set the concentration of the firefighting material. The mixer can be active or passive. In examples, the diluter can have one or more settings to set a specific firefighting material concentration. The mixer is preferably an electronic actuator (e.g., electric motor), but can additionally or alternatively be a manual mixer (e.g., paddle, shaker, etc.), pneumatic mixer, and/or operate via any suitable mechanism.

In variants, the application system optionally includes an agitator. The agitator preferably functions to keep the firefighting material well dispersed by agitating it at a given timing (e.g., fixed timing, timing set by user, timing set by manufacturer, etc.). The agitator can be the same as or different from the mixer.

In variants, the application system optionally includes one or more sensors. The sensor(s) preferably function to detect the firefighting material quality (e.g., age, physical properties, functionality, etc.). The sensor(s) can optionally include one or more indicators that preferably function to inform the user of the state of the firefighting material. The sensors can include: pressure gauge, clock, optical sensors (e.g., infrared, UV/vis, etc.), rheology sensors (e.g., viscometer), and/or other suitable sensors.

In a specific example, the application system is a fire extinguisher that is loaded with firefighting material. When in use, a user can operate the fire extinguisher (e.g., aiming the nozzle of the fire extinguisher at the fire and by depressing an operating lever) to direct firefighting material at the fire.

In a second specific example, the application system is a sprinkler system coupled to a reservoir containing the firefighting material. When in use, firefighting material from the reservoir is passed into the sprinkler (e.g., via tubing) which sprays the firefighting material over the fire.

In a third specific example, the application system is a container that holds the firefighting material. The firefighting material can be a solid or a liquid. In this example, the firefighting material can be applied to a fire by pouring the material out of the container and/or by scooping the material out of the container and onto the fire.

In a fourth specific example, the firefighting material can be included in the application system as separate elements that must be mixed prior to application to the fire. For example, separate containers can hold each of the elements (e.g., salt, encapsulated material, surfactant, solvent, additives, nanoparticles, etc.). When the firefighting material is needed, the application system can mix the elements (e.g., in a mixing compartment, at the nozzle, etc.) in a manner that forms the firefighting material.

In a fifth specific example, the firefighting material can be in a concentrated form (e.g., high concentration liquid mixture, solid mixture, etc.). When the fire fighting material is needed, the application system can add a suitable solvent (e.g., amount, material, etc.) to dilute the concentrated firefighting material to an operational concentration.

4. Method of Manufacture

In a first embodiment, the method of manufacture of nanoparticles (e.g., including encapsulated material) can include: forming an emulsion of encapsulated material, precipitating salt to form nanoparticles, coupling surfactant with the nanoparticles, and/or any other suitable elements. The method is preferably performed by the system disclosed above, such as the application system, but can additionally or alternatively be performed by a remote system, manually, and/or by any other suitable system.

Forming an emulsion of encapsulated material preferably functions to produce micelles of encapsulated material around which the nanoparticle grows. The micelles preferably act as nucleation sites for salt precipitation but can additionally or alternatively function in any suitable manner. Forming an emulsion preferably includes agitating a mixture of solvents and encapsulated material to form an emulsion of micelles and controlling the physical properties of the mixture. Forming an emulsion preferably occurs before precipitating salt, but can occur simultaneously with precipitating the salt. Forming an emulsion of encapsulated material preferably uses at least a critical micelle concentration (CMC) of encapsulated material; however, forming an emulsion of encapsulated material can use any suitable concentration of encapsulated material. In a specific example, the CMC can be 0.1 to 50 mM; however, any CMC can be used. The CMC can depend on the encapsulated material (e.g., the length of an alkyl chain of the encapsulated material). However, the CMC can additionally or alternatively depend on the temperature, solvent, mixture of encapsulated materials, and/or on any suitable properties.

Agitating a mixture of solvents and encapsulated material is preferably performed by the agitator, but can additionally or alternatively be performed by any suitable device. Agitating a mixture preferably functions to form micelles, where the micelles include the encapsulated material. The mixture of solvents preferably includes at least two immiscible solvents (e.g., aqueous and organic, polar and non polar, etc.), but can additionally or alternatively include a single solvent, additives, and/or any other suitable materials or combination of materials. In a specific example, the solvents can be water and diethanol amine and the encapsulated material is an ionic liquid. In another specific example, the solvent can be water and the encapsulated material can be a phospholipid. In this specific example, micelle formation additives such as cholesterol can be included to set the desired phospholipid micelles.

Controlling physical properties of the mixture is preferably performed by the application system, but can additionally or alternatively be performed by any suitable device. Controlling physical properties preferably functions to change the physical properties of the mixture of solvents and encapsulated material to generate micelles with specific micellar properties (e.g., size, shape, numerosity, stability, packing parameter, structure, etc.). The physical properties of the mixture can include: temperature, concentration (e.g., relative concentration of different solvents, concentration of encapsulated material in one or more of the solvents, etc.), pH, time (e.g., duration of agitation, duration mixture is together, etc.), speed of mixing (e.g., dropwise, all at once, etc.), and/or any other suitable parameter.

Precipitating salt to form nanoparticles preferably functions to grow a salt layer around the micelles. Precipitating salt preferably occurs after forming an emulsion and before coupling surfactant, but can additionally or alternatively occur at the same time as forming an emulsion, at the same time as coupling surfactant, and/or with any suitable timing. Precipitating salt preferably includes adding the salt cation to the mixture containing micelles, and adding the salt anion to the mixture containing micelles, but can additionally or alternatively include any suitable elements. Precipitating salt is preferably performed by the application system, but can additionally or alternatively be performed by any suitable device.

Adding the salt cation and adding the salt anion preferably occur from separate solutions (e.g., a cation solution such as a solution containing dissolved cations and an anion solution such as a solution containing dissolved anions), but can additionally or alternatively be from the same solution, from solids, from a combination of solutions and solids, from gases, and/or in any suitable manner. Adding the salt cation and the salt anion can occur simultaneously, the cation can be added before the anion, the anion can be added before the cation, the anion and cation can be introduced in an alternating manner, and/or the species can be introduced in any suitable order. The thickness of the salt layer can be controlled based on: amount of cations and anions added (e.g., mass), the concentration of micelles (e.g., more micelles leads to a thinner salt layer, fewer micelles leads to a thicker salt layer, etc.), the solvent mixture (e.g., the solubility of the salt in the solvent(s) used), the micelle properties (e.g., as above), the incubation time, the incubation temperature, and/or otherwise controlled. In a specific example, to prepare a layer of $MgCO_3$ around an ionic liquid encapsulated material layer, a solution of magnesium chloride (e.g., $MgCl_2$) dissolved in water is added to the ionic liquid micelles. Subsequently, sodium carbonate (e.g., $Na_2CO_3$) dissolved in water is added to the mixture. Magnesium carbonate then precipitates onto the micelles, thereby growing the salt layer.

Coupling surfactant on a nanoparticle preferably functions to interact the surfactant with the nanoparticles to solubilize the nanoparticles in solution and increase the stability of the solution. Coupling surfactant preferably occurs after precipitating salt, but can occur simultaneously with precipitating salt. In variants, material left after forming an emulsion (e.g., that a salt layer does not grow around) can function as the surfactant for coupling surfactant. However, additional and/or alternatively, surfactant (the same and/or different from the encapsulated material) can be added to the sample including precipitated salt. Coupling surfactant is preferably performed by the application system, but can additionally or alternatively be performed by any suitable device. The surfactant can be adsorbed onto the nanoparticle (e.g., onto the salt layer); absorbed onto the nanoparticle; bonded such as by ionic bonds, covalent bonds, metallic bonds, hydrogen bonds, van der Waals interactions, and/or any other suitable set of bonds; dissolved in solution; or be otherwise coupled to the nanoparticle.

Coupling surfactant can include: adding surfactant to the nanoparticle solution, controlling solution pH, controlling solution temperature, controlling the relative concentration of surfactant to nanoparticles, controlling the absolute concentration of surfactant and nanoparticles, modifying the solvent mixture (e.g., adding new solvent, adding the same solvent, evaporating solvent, etc.), waiting an amount of time (e.g., predetermined amount of time; amount of time that depends on the nanoparticle and/or surfactant; amount of time that depends on solution parameters such as temperature, pH, etc.; etc.), mixing for an amount of time, and/or any other suitable steps.

In variants, one or more elements from the method of nanoparticle manufacture can be repeated to add additional layers to the nanoparticle.

Figure 6:
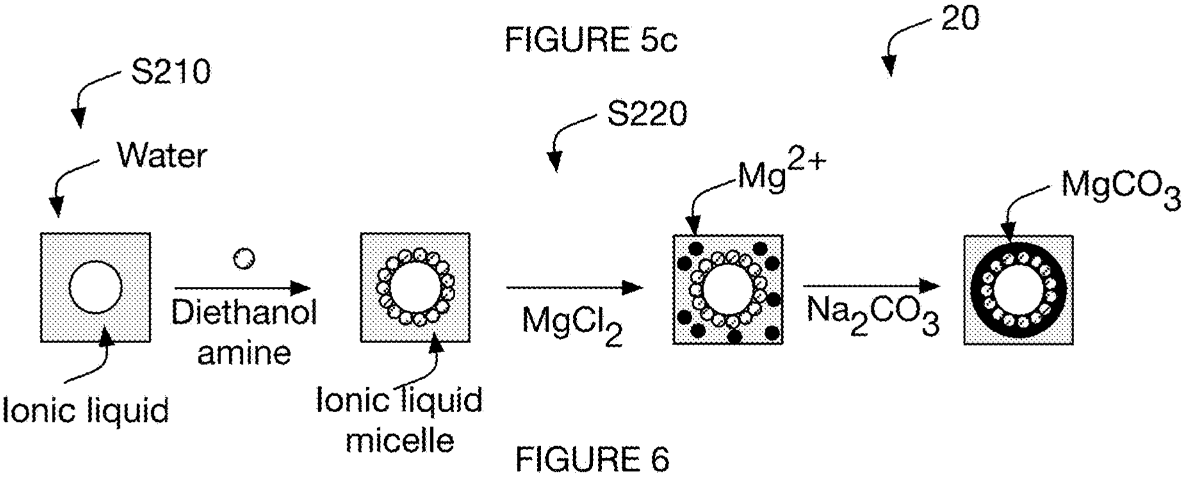
FIG. 6 is a schematic representation of a specific example of a method of manufacture for a nanoparticle.

In a specific example, as shown in FIG. 6, when the encapsulating material is 1-hexyl-3-methyl imidazolium chloride, micelles of 1-hexyl-3-methyl imidazolium chloride can be formed in a mixture of water and diethanol amine. After the micelles are formed, a solution of magnesium chloride dissolved in water and a separate solution of sodium carbonate dissolved in water are added to the solution including micelles of 1-hexyl-3-methyl imidazolium chloride. Excess 1-hexyl-3-methyl imidazolium chloride is then added as the surfactant for the nanoparticles. In this specific example, each of the steps can be repeated to grow additional layers.

In another example, the encapsulated material is the same as the salt layer. In this example, the $MgCO_3$ nanoparticles can be grown by adding a solution of magnesium chloride dissolved in water and a separate solution of sodium carbonate dissolved in water to a solution containing $MgCO_3$ seed crystals (e.g., solid $MgCO_3$ that is suspended in a solution as micelles such as $MgCO_3$ with spatial dimensions <2 nm). 1-octyl-3-ethyl imidazolium chloride can be added at substantially the same time as the above solutions to function as the surfactant and stabilize the $MgCO_3$ nanoparticles in solution.

In a third example, when the encapsulated material is 1-hexyl-3-methyl imidazolium chloride, micelles of 1-hexyl-3-methyl imidazolium chloride can be formed in a mixture of water and diethanol amine. After the micelles are formed, a solution of magnesium chloride dissolved in water and a separate solution of sodium carbonate dissolved in water are added to the solution including micelles of 1-hexyl-3-methyl imidazolium chloride. To grow a second salt layer, wherein the second salt is calcium carbonate (e.g., $CaCO_3$), a solution of calcium chloride dissolved in water and a separate solution of sodium carbonate dissolved in water are added to the solution including micelles of 1-hexyl-3-methyl imidazolium chloride coated with a layer of $MgCO_3$. 1-octyl-3-methyl imidazolium chloride can then be added as the surfactant for the nanoparticles.

In a second embodiment, the method of manufacture of nanoparticles can include precipitating nanoparticles (e.g., using a solution-phase synthesis). The solution-phase synthesis can include mixing a solution of cations with a solution of anions and/or any suitable steps. The cation and anion solutions are preferably mixed in a solvent that the nanoparticle material is insoluble in. However, the cation and anion solutions can be mixed in a solvent that that nanoparticle material is weakly soluble in and/or soluble in. The cation and anion solutions are preferably mixed in the presence of surfactant. However, surfactant can be added at the same time as the ions are added and/or the surfactant can be added after the anion and cation solutions have been mixed.

The solutions (e.g., cation, anion, surfactant, additive, etc.) preferably have a concentration between 0.1 mM to 10 M, such as 0.1 M; however, the solutions can have any suitable concentration. Each solution can have the same or different concentration. In specific variants, the concentration of the cations in the cation solution preferably matches the concentration of the anions in the anion solution. For example, the ratio of cations to anions in solution can match the stoichiometric ratio of cations to anions in the nanoparticle. However, an excess of cations and/or an excess of anions can be used (for example to drive the nanoparticle formation to completion, to prevent the dissolution of the nanoparticles, etc.). In variants, the volume of each solution that is mixed preferably depends on the concentration of each solution. However, the volume of each solution can be a constant, determined empirically, modeled, calculated, and/or any suitable volume can be used.

The solutions can be mixed (e.g., added to one another) dropwise, all at once, charged in stepwise volumes (e.g., where each step can have the same or different volumes), and/or the solutions can be added to each other in any suitable manner. The solutions can be added within an adding time (e.g., 1 ms, 10 ms, 100 ms, 1 s, 10 s, 1 min, 10 min, 30 min, 1 hour, etc.) but the solutions can be mixed within any suitable amount of time. The solutions can be mixed for a mixing time (e.g., 1 s, 10 s, 1 min, 10 min, 30 min, 1 hour, 2 hours, 4 hours, 8 hours, etc.), but the solutions can be mixed for any suitable amount of time. The time (e.g., adding time, mixing time, etc.) can be based on the nanoparticle properties (e.g., size, material, concentration, solubility, etc.), the solution properties (e.g., concentration, volume, etc.), a target completion time, the temperature (e.g., solution temperature, ambient temperature, etc.), the cation, the anion, the surfactant, additive, and/or be based on any suitable property.

In a specific example of this embodiment, nanoparticles including calcium carbonate ($CaCO_3$) can be synthesized according to a solution based method. In this example, a 100 ml 0.1 M solution of sodium carbonate ($Na_2CO_3$) and 1-methyl-3-decyl-immidazolium chloride was added dropwise to a solution of 100 ml 0.1 M calcium chloride ($CaCl_2$) and sodium dodecylbenzene sulfonate (SDBS) in water. The solutions can be stirred for 60 minutes after the last drop was added. After the mixing time, the nanoparticles can be centrifuged and washed (e.g., using water, using solvents) thoroughly before use.

In a third embodiment of a method of manufacturing nanoparticles, the nanoparticles can be synthesized according to a solid-phase synthesis. The solid-phase synthesis can be preferred because it is a green synthesis (e.g., a synthesis that produces less than a threshold amount of waste), but other synthesis methods can be used. The solid-phase synthesis preferably includes mixing solids, combining the solids, and, optionally, solubilizing the nanoparticles; however, the solid-phase synthesis can include any suitable steps. Mixing solids preferably mixes a solid including the cation and a solid including the anion (e.g., the cation and the anion corresponding to the nanoparticle). The solids are preferably mixed in the stoichiometric ratio corresponding to the target nanoparticle composition, but excess solids including the anions and/or cations can be mixed. In variants, additives (e.g., solid additives) can be included in the mixture. The solid additives can be included to control the nanoparticle size, completion, composition, and/or for any suitable purpose. The solids are preferably mixed in the solid state, but the solids can be mixed in solution (e.g., wherein the solvent can be evaporated), in the gas phase (e.g., wherein the gas can precipitate), and/or in any suitable manner Combining the solids preferably functions to react the solids together to form nanoparticles. The solids are preferably combined by grinding (e.g., ball milling, mortar and pestle, planetary ball mill, etc.). However, the solids can be combined by crushing, milling, magnetic stirring, by adding solvent, and/or in any suitable manner. The solids are preferably combined for a grinding time (e.g., 30 min, 1 hour, 2 hours, 4 hours, 8 hours, 12 hours, 24 hours, 48 hours, etc.), but the solids can be combined for any suitable amount of time. The solids can be ground at any suitable rate between 1 to 1000 revolutions per minute (rpm), but the grinding can be performed at any suitable rate.

In variants including solubilizing the nanoparticles solubilizing the nanoparticles preferably functions to stabilize the nanoparticles to form a stable solution. Solubilizing the nanoparticles preferably includes adding surfactant to the ground nanoparticles, but can include any suitable steps. The surfactant can be added as a concentrate, solid, as a solution, and/or in any suitable phase. The surfactant is preferably added in a ratio of 10 to 1,000,000 surfactant molecules per nanoparticle, however, any suitable amount of surfactant can be added.

In a specific example, a 1:1:1 mixture of calcium chloride, sodium carbonate, and sodium chloride can be mixed to form calcium carbonate nanoparticles. The calcium chloride, sodium carbonate, and sodium chloride can be milled for 2 hours at 300 rpm. The milling process can use a set of balls each weighing 4 grams. However, the nanoparticles can be formed in any suitable manner.

However, the nanoparticles can be synthesized in any suitable manner.

In embodiments, the surfactants, additives, (e.g., ionic liquids) and/or firefighting material are preferably formed in a single pot synthesis (e.g., a synthetic procedure that can be performed using a single set of glassware and does not require intermediate cleaning steps, synthesis requiring a single step from readily available starting materials, solvent-free conditions, etc.). However, the surfactants and/or additives can be manufactured in any suitable manner.

Figure 10A:
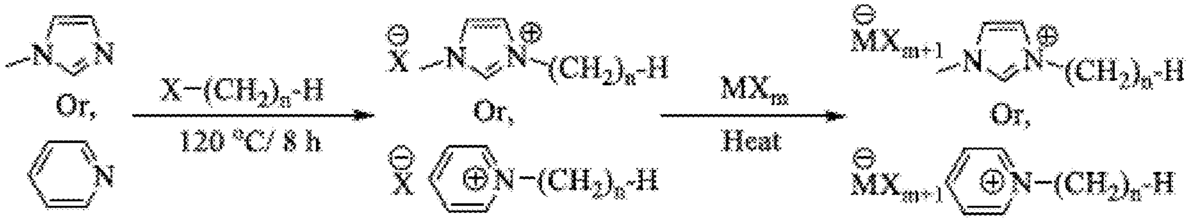
FIGS. 10A-10E are schematic representations of examples of methods of manufacturing surfactants and/or additives.

In a specific example as shown in FIG. 10A, imidazolium (and/or pyridinium) based surfactants can be synthesized by heating a mixture of alkyl halides with 1-methylimidazole (and/or pyridine). The mixture can be heated to 120° C. The materials can be mixed for up to 8 hours, but the materials can be mixed for any suitable amount of time. After cooling the reaction mixture, the products can be recrystallized from ethylacetate:hexane (90:10) mixture to increase the purity of the products. In related examples, metallosurfactants can be prepared by heating the purified products in the presence of the metal halide (such as copper chloride ($CuCl_2$), iron chloride ($FeCl_2$), etc.) to approximately 100° C. for upto 4 hours. However, the surfactants can be synthesized in any suitable manner.

Figure 10B:
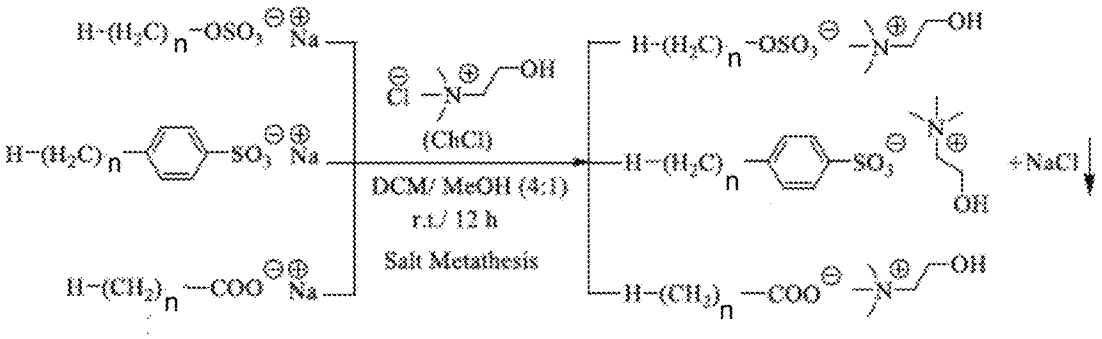

In a specific example as shown in FIG. 10B, a method of manufacture for carbonate, sulfate, and/or sulfonate based surfactants (e.g., including branched or unbranched four to twenty-six carbon atom chains that can be saturated, unsaturated, and/or aromatic) can include a salt metathesis synthesis. In this example, solutions of the sodium salt of the respective sulfate, sulfonate, and/or carbonate can be dissolved in methanol. In this example, a choline chloride solution (e.g., choline chloride dissolved in methanol) can be prepared. However, the choline chloride can be added directly to the sodium salt solution. The ratio of choline to carbonate, sulfate, and/or sulfonate preferably matches the stoichiometric ratio of the target surfactant and/or additive, but any suitable ratio can be used. The sodium salt solution and choline chloride solutions can be mixed. The solutions are preferably mixed at room temperature, but can be mixed at any suitable temperature. The mixture was then diluted with dichloromethane (DCM). The amount of DCM is preferably based on the amount of methanol (e.g., four times as much DCM as total methanol in the solution). However, the amount of DCM can be a fixed (e.g., a predetermined volume) and/or any suitable amount of DCM can be added. The solution can be mixed for any suitable amount of time (e.g., 30 min, 45 min, 1 hour, 2 hours, 4 hours, 8 hours, 12 hours, 24 hours, etc.). After mixing, precipitates (e.g., sodium chloride) are filtered out. After filtering, the solvent (e.g., methanol, DCM) can be evaporated (e.g., with a rotary evaporator, sparging, raising the solution temperature, under vacuum, etc.).

Figure 10C:
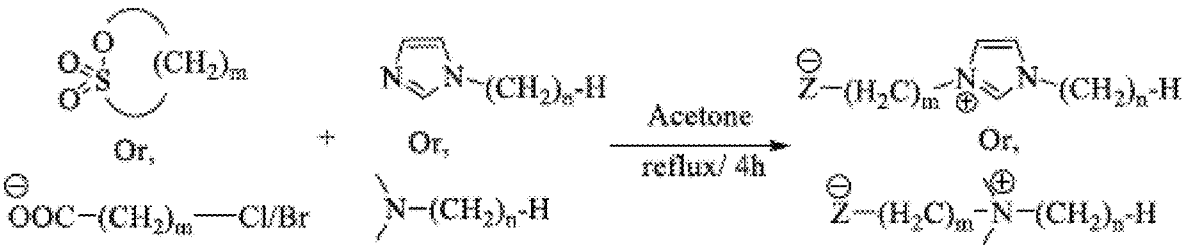

In specific examples as shown in FIG. 10C, the zwitterionic salts (e.g., betaines, sulfobetaines, sulfanobetaines, etc.) can be synthesized by mixing halo-carboxylates, halo-sulfates, and/or halo-sulfonates with alkylimidazoles and/or tertiary amines. The mixture can be diluted in solvent (e.g., acetone). The mixture can be refluxed and/or performed at any suitable temperature. The solution can be mixed for any suitable amount of time (e.g., 30 min, 45 min, 1 hour, 2 hours, 4 hours, 8 hours, 12 hours, 24 hours, etc.). After the solution have been mixed, the zwitterionic salts can be recrystallized from methanol (and/or any suitable solvent).

Figure 10D:
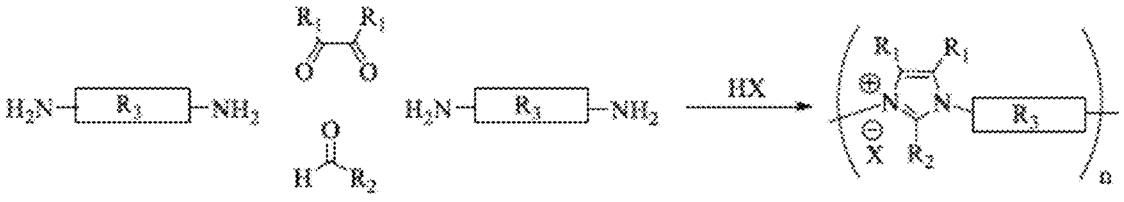

In specific examples as shown in FIG. 10D, polymeric ionic liquids (PILs) can be synthesized by mixing diamines, diketone (and/or dialdehyde), and an aldehyde in the presence of hydrochloric and/or hydrobromic acid (e.g., via a Radziszewski reaction). The diketone and/or aldehyde can include any suitable alkyl chains (e.g., 1-26 carbon atoms; branched or unbranched; saturated, unsaturated, and/or aromatic; etc.) and/or any suitable functional groups. The diamine can include any suitable alkyl chain (e.g., 1-26 carbon atoms; branched or unbranched; saturated, unsaturated, and/or aromatic; etc.), polymer chain (e.g., polyethylene glycol) between the amine functional groups, and/or any suitable functional groups. The degree of polymerization can be determined based on the relative concentrations of the components, the pH of the solution, the functional groups of any of the components, the temperature of the solution, the amount of time the solution is mixed, and/or can be determined in any suitable manner.

Figure 10E:
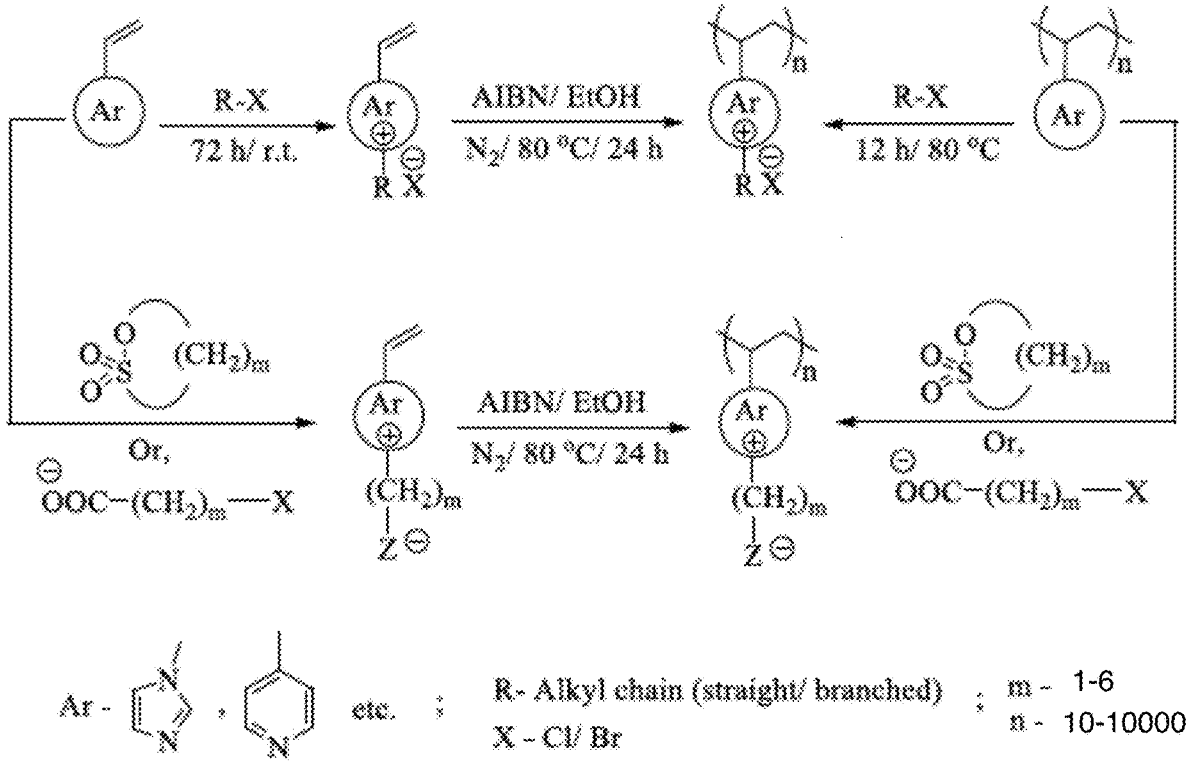

In a second specific example as shown in FIG. 10E, polymeric ionic liquids can be synthesized by a radical polymerization reaction. In this example, the method of manufacture can include forming an ion and polymerizing a material. The ion can be a cation, an anion, and/or a zwitterion. Form the ion can occur before, during, and/or after polymerizing the material. The material can be a salt, an organic compound, a neutral species, and/or any suitable material. The material preferably includes an ethylene moiety, but the material can include any suitable moiety for generating a polymer. In a specific variation of this example, the material can be an aryl group (e.g., imidazole, pyridine, etc. including any suitable alkyl and/or cycloalkyl chains such as 1-26 carbon atoms that are branched or unbranched) bonded to an ethylene moiety. However, any suitable material(s) can be used. The aryl group (as a monomer and/or as a polymer) can be converted to an ion (cation, anion, and/or zwitterion) by reacting with an alkyl halide, sulfate halide, sulfonate halide, and/or carboxylate halide—any of which can include 1-26 carbon atoms; branched or unbranched; saturated, unsaturated, and/or aromatic; heteroatomic subgroups. The reaction can be performed at room temperature (e.g., 20° C.), 25° C., 30° C., 50° C., 80° C., 100° C., 120° C., 150° C., 200° C., and/or at any suitable temperature. The reaction can be performed for any suitable reaction time (e.g., 1 hour, 2 hours, 4 hours, 8 hours, 12 hours, 24 hours, 48 hours, 72 hours, 1 week, etc.). Polymerizing the material preferably includes mixing a radical initiator with the material in a solvent (e.g., ethanol). The radical initiator is preferably azobisisobutyronitrile (AIBN), but can be any suitable azo compound. However, additionally or alternatively, the radical initiator can be a halogen (e.g., chlorine, bromine, iodine), peroxide (e.g., tert-butyl peroxide, benzoyl peroxide, methyl ethyl ketone peroxide, acetone peroxide, peroxydisulfate, etc.), and/or any suitable radical initiator can be used. The polymerization reaction can be performed at room temperature (e.g., 20° C.), 25° C., 30° C., 50° C., 80° C., 100° C., 120° C., 150° C., 200° C., and/or at any suitable temperature. The polymerization reaction can be performed for any suitable polymerization reaction time (e.g., 1 hour, 2 hours, 4 hours, 8 hours, 12 hours, 24 hours, 48 hours, 72 hours, 1 week, etc.).

However, the surfactants and/or additives can be formed in any suitable manner.

The method of manufacture (e.g., of nanoparticles, of surfactants, of additives, etc.) can optionally include washing the manufactured materials (e.g., nanoparticles, surfactant, additive, etc.). Washing the materials preferably functions to remove excess and/or unreacted elements and/or reagents (e.g., cations, anions, surfactant, additive, etc.) from the materials. In specific examples, washing the materials can function to generate a narrower nanoparticle size distribution and/or ensure that the nanoparticles have any suitable properties. Washing the materials preferably includes washing the materials using solvent (e.g., water, organic solvents such as methanol, ethanol, acetone, dichloromethane, benzene, toluene, ethyl acetate, chloroform, 1-propanol, isopropyl alcohol, butanol, etc., and/or combinations of solvents). However, washing the materials can include centrifuging the materials, dialyzing the materials, using chromatography techniques (e.g., column chromatography such as HPLC, UPLC, etc.; gas chromatography; etc.), distilling the materials, precipitating the materials, recrystallizing the materials, and/or any suitable steps. In variants including centrifuging the materials, the materials can be centrifuged with any suitable force from 100 g to 10000 g, but any suitable centrifuge force can be used. The centrifuge force preferably depends on the material size, but the centrifuge force can additionally or alternatively depend on the material concentration, the material solubility, the material composition, the solvent, the material mass, and/or any suitable properties.

5. Examples

In a first example, the firefighting solution includes a solvent and surfactants. In this example, the firefighting solution does not include nanoparticles.

In a second example, the firefighting solution includes a solvent and nanoparticles (e.g., of the same or different type). In this example, the firefighting solution can optionally include: surfactants, additives, and/or any other suitable component.

In a first specific example, a firefighting solution can include water. The firefighting solution can include greater than 1% ionic liquid surfactant. The firefighting solution can have a spreading coefficient of at least 3. The firefighting solution can have a quarter life of greater than 2.5 minutes. The firefighting solution can have a viscosity at 25° C. of greater than or equal to 2 centistokes. The firefighting solution can have a viscosity at 5° C. of less than or equal to 20 centistokes. In this specific example, The firefighting solution can have a halide content of less than 500 parts per million. The firefighting solution can have a pH between 7.0 and 8.5. The firefighting solution can have a low carbon steel corrosion rate of at most 1.5 milli in/year, a (90-10) copper-nickel corrosion rate of at most 1.0 milli in/year, a (70-30) nickel-copper corrosion rate of the solution of at most 1.0 milli in/year, and a bronze corrosion rate of at most 100 milligrams. The firefighting solution can have a refractive index of at least 1.3580.

In a second specific example, a firefighting system can include an at least 1% aqueous solution. The aqueous solution can include an ionic liquid surfactant and a nanoparticle. The nanoparticle can include a nanoparticle size distribution, wherein a peak of the size distribution can be between 1 and 500 nm. In this specific example, nanoparticle can include encapsulated material inside the nanoparticle. The encapsulated materials can include a second ionic liquid surfactant, wherein the second ionic liquid surfactant can be the same and/or different from the ionic liquid surfactant. In this specific example, the nanoparticle can include a metal carbonate, wherein the metal carbonate decomposes to a metal oxide and carbon dioxide at temperatures above 50° C. In this specific example, the metal carbonate can include at least one of: beryllium carbonate, magnesium carbonate, calcium carbonate, strontium carbonate, barium carbonate, radium carbonate, scandium carbonate, titanium carbonate, vanadium carbonate, chromium carbonate, manganese carbonate, iron carbonate, cobalt carbonate, nickel carbonate, copper carbonate, zinc carbonate, yttrium carbonate, combinations thereof and/or any suitable metal carbonate can be used. The ionic liquid surfactant can include: a cation selected from: choline,

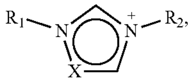
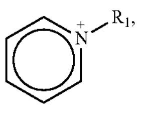
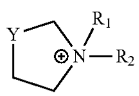
,
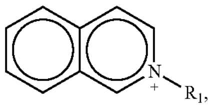
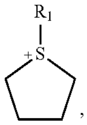
,
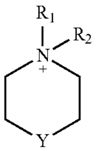
, and
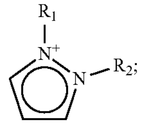

and an anion selected from: carbonate, sulphate, tosylate, mesylate, ethane sulphonate, besylate, closilate, camsylate, nosylate, brosylates, dansylate, sulphite, chloride, bromide, iodide, tetrachloroferrate (II), tetrachloroferrate (III), tetrachlorocuprate (II), tetrachlorozincate, tetrachlorocobalate (II), tetrachloroaluminate, $R_1$—$COO^-$,

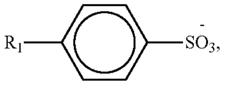

$R_1$—$OSO_3^-$; wherein: x can be CH or N; y can be $CH_2$, O or S; $Z^-$ can be —$COO^-$, —$SO_3^-$, or —$OSO_3^-$; and $R_1$ and $R_2$ can be identical or different and are each H, $C_1$-$C_{26}$-alkyl, or $C_1$-$C_{26}$ cycloalkyl. However, any suitable ionic liquid can be used. The system can include an additive, selected from: TWEEN 80, Span 80, Brij 20, Brij 58, Triton X-100, $R_1$—OH,

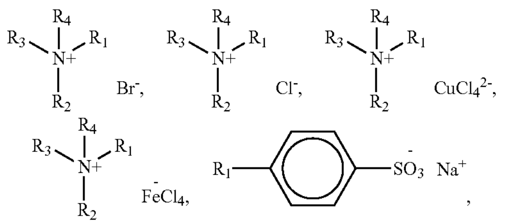

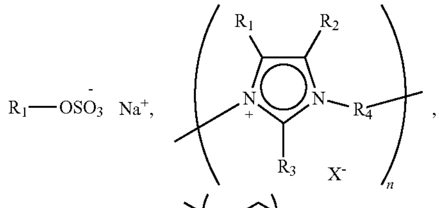

and

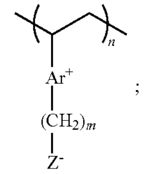

;

wherein: $R_1$, $R_2$, $R_3$, and $R_4$ can be identical or different and can be each C1-C26-alkyl or C1-C26 cyclo-alkyl; n is 10-10,000; m is 1-6; X is selected from: carbonate, sulphate, chloride, bromide, iodide, tetrachloroferrate (II), tetrachloroferrate (III), tetrachlorocuprate (II), tetrachlorozincate, tetrachlorocobalate (II), tetrachloroaluminate, and combinations thereof; and Z is $—COO^-$, $—SO_3^-$, or $—OSO_3^-$. However, any suitable additive an be used. In this specific example, the system can include a zwitterionic surfactant selected from:

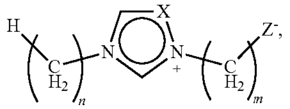

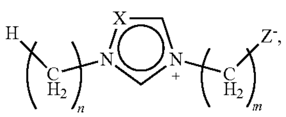

and

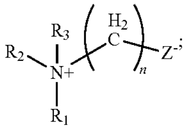

wherein n is 4-18; m is 1-6; x is CH or N; $Z^-$ is $—COO^-$, $—SO_3^-$, or $—OSO_3^-$; and $R_1$, $R_2$, and $R_3$ can be identical or different and can each $C_1$-$C_{26}$-alkyl or $C_1$-$C_{26}$ cycloalkyl. However, any suitable zwitterionic surfactant can be used. However, the system can include any suitable components. In this specific example, the firefighting system can include an application mechanism configured to disperse the solution toward a fire. The application mechanism can be a fire extinguisher.

In a related example, the nanoparticle can be an onion nanoparticle. In this example, the onion nanoparticle can include one or more encapsulated materials. The encapsulated materials can include layers of surfactant and/or additives alternating with layers of metal salt. However, the encapsulated materials can include adjacent layers of surfactant and/or additives, adjacent layers of metal salt, mixed layers (e.g., including surfactant, additive, and/or metal salt), a hollow core (e.g., core filled with gas, with solvent, etc.), one or more hollow layers (e.g., adjacent to metal salt, alternating with metal salt layers, adjacent to surfactant layers, alternating with surfactant layers, etc.), and/or any suitable layers. Each layer can be the same size (e.g., same thickness, same volume, same mass, etc.) and/or different size (e.g., different thickness, different volume, different mass, etc.). Each layer can have any suitable thickness and or range thereof between 1-100 nm; however, each layer can have any suitable thickness. However, onion nanoparticles can be arranged in any suitable manner.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

I claim:

1. A firefighting solution comprising:
water;
an ionic liquid surfactant;
a metallosurfactant; and
wherein a spreading coefficient of the solution is at least 3, wherein a quarter life of the solution is greater than 2.5 minutes, wherein the viscosity of the solution at 5° C. is less than or equal to 25 centistokes.

2. The solution of claim 1, wherein a halide content of the solution is less than 500 parts per million.

3. The solution of claim 1, wherein a pH of the solution is between 6.0 and 8.5.

4. The solution of claim 1, wherein a low carbon steel corrosion rate of the solution is at most 1.5 milli in/year, wherein a (90-10) copper-nickel corrosion rate of the solution is at most 1.0 milli in/year, wherein a (70-30) nickel-copper corrosion rate of the solution is at most 1.0 milli in/year, and wherein a bronze corrosion rate of the solution is at most 100 milligrams.

5. The solution of claim 1, wherein the ionic liquid surfactant comprises:
a cation selected from the group comprising:
choline,

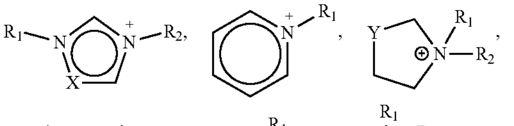

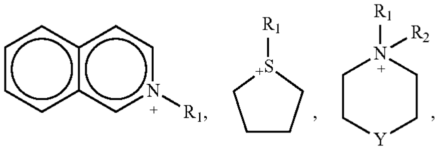

and

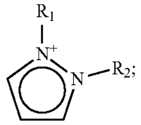

an anion selected from the group comprising:
carbonate, sulphate, tosylate, mesylate, ethane sulphonate, besylate, closilate, camsylate, nosylate, brosylates, dansylate, sulphite, chloride, bromide, iodide, tetrachloroferrate (II), tetrachloroferrate (III), tetrachlorocuprate (II), tetrachlorozincate, tetrachlorocobalate (II), tetrachloroaluminate, $R_1$—$COO^-$,

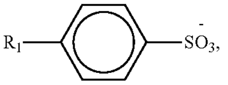

$R_1$—$OSO_3^-$; and wherein:

x is CH or N;

y is $CH_2$, O or S;

$Z^-$ is —$COO^-$, —$SO_3^-$, or —$OSO_3^-$; and $R_1$ and $R_2$ are identical or different and are each $C_1$-$C_{26}$-alkyl or $C_1$-$C_{26}$ cycloalkyl.

6. The solution of claim 1, wherein the solution comprises a nanoparticle, wherein the nanoparticle comprises a metal carbonate, wherein the metal carbonate comprises at least one of: beryllium carbonate, magnesium carbonate, calcium carbonate, strontium carbonate, barium carbonate, radium carbonate, scandium carbonate, titanium carbonate, vanadium carbonate, manganese carbonate, iron carbonate, cobalt carbonate, nickel carbonate, copper carbonate, zinc carbonate, and yttrium carbonate.

7. The solution of claim 1, wherein the solution comprises a zwitterionic surfactant, wherein the zwitterionic surfactant comprises at least one of:

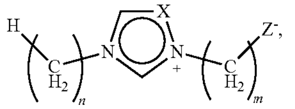

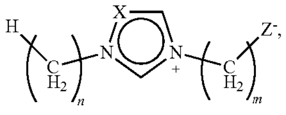

or

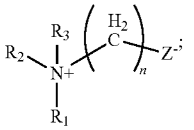

wherein n is 4-18;

m is 1-6;

x is CH or N;

$Z^-$ is —$COO^-$, —$SO_3^-$, or —$OSO_3^-$; and $R_1$, $R_2$, and $R_3$ are identical or different and are each $C_1$-$C_{26}$-alkyl or $C_1$-$C_{26}$ cycloalkyl.

8. The solution of claim 1, wherein the solution comprises an additive, wherein the additive comprises at least one of: polysorbate 80, sorbitan monoleate, polyethylene glycol octadecyl ether, polyethylene glycolhexadecyl ether, 2-[4-(2,4,4-trimethylpentan-2-yl) phenoxy]ethanol, $R_1$—OH ,

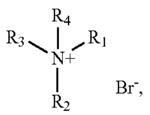

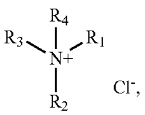

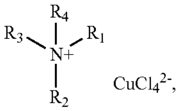

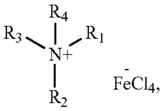

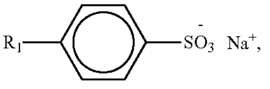

$R_1$—$\overset{-}{OSO_3}$ $Na^+$,

-continued

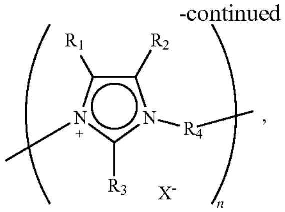

, or

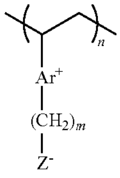

;

wherein:

$R_1$, $R_2$, $R_3$, and $R_4$ are identical or different and are each C1-C26-alkyl;

n is 10-10,000;

m is C1-C6;

X is selected from the group comprising: carbonate, sulphate, chloride, bromide, iodide, tetrachloroferrate (II), tetrachloroferrate (III), tetrachlorocuprate (II), tetrachlorozincate, tetrachlorocobalate (II), tetrachloroaluminate, and combinations thereof; and Z is —$COO^-$, —$SO_3^-$, or —$OSO_3^-$.

9. A firefighting system, comprising:

an at least 1% aqueous solution comprising:

an ionic liquid surfactant;

a metallosurfactant; and a nanoparticle; and an application mechanism configured to disperse the solution toward a fire;

wherein a halogen content of the solution is less than 500 parts per million.

10. The system of claim 9, wherein the nanoparticle comprises a size distribution, wherein a peak of the size distribution is between 1-500 nm.

11. The system of claim 9, further comprising a second ionic liquid surfactant encapsulated within the nanoparticle, wherein the second ionic liquid surfactant is the same as the ionic liquid surfactant.

12. The system of claim 9, wherein the nanoparticle comprises a metal carbonate, wherein the metal carbonate decomposes to a metal oxide and carbon dioxide at temperatures above 50° C.

13. The system of claim 12, wherein the metal carbonate comprises at least one of: beryllium carbonate, magnesium carbonate, calcium carbonate, strontium carbonate, barium carbonate, radium carbonate, scandium carbonate, titanium carbonate, vanadium carbonate, manganese carbonate, iron carbonate, cobalt carbonate, nickel carbonate, copper carbonate, zinc carbonate, yttrium carbonate, and combinations thereof.

14. The system of claim 9, further comprising a zwitterionic surfactant, wherein the zwitterionic surfactant comprises at least one of:

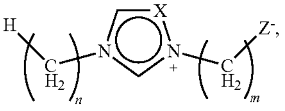

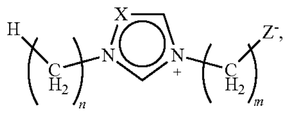

or

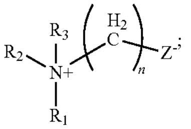

wherein n is 4-18;

m is 1-6;

x is CH or N;

$Z^-$ is —$COO^-$, —$SO_3^-$, or —$OSO_3^-$; and $R_1$, $R_2$, and $R_3$ are identical or different and are each $C_1$-$C_{26}$-alkyl or $C_1$-$C_{26}$ cycloalkyl.

15. The system of claim 9, further comprising an additive, wherein the additive comprises at least one of:

polysorbate 80, sorbitan monoleate, polyethylene glycol octadecyl ether, polyethylene glycolhexadecyl ether, 2-[4-(2,4,4-trimethylpentan-2-yl) phenoxy]ethanol,

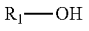 , 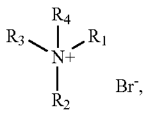 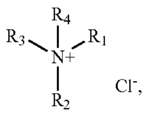 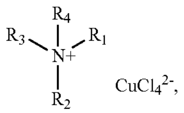 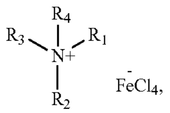 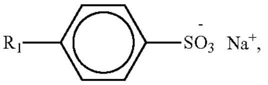 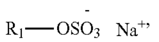 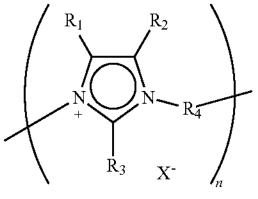 , or 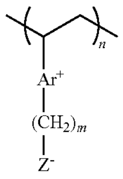 ;

and wherein:

$R_1$, $R_2$, $R_3$, and $R_4$ are identical or different and are each C1-C26-alkyl;

n is 10-10,000;

m is 1-6;

X is selected from the group comprising: carbonate, sulphate, chloride, bromide, iodide, tetrachloroferrate (II), tetrachloroferrate (III), tetrachlorocuprate (II), tetrachlorozincate, tetrachlorocobalate (II), tetrachloroaluminate, and combinations thereof; and Z is —$COO^-$, —$SO_3^-$, or —$OSO_3^-$.

16. The system of claim 9, wherein the ionic liquid surfactant comprises:

a cation selected from the group comprising:

choline,

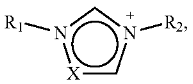 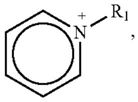 , 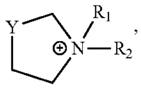 , 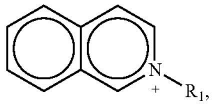 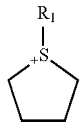 , 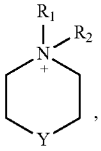 , and 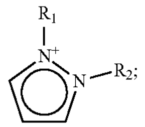

an anion selected from the group comprising:

carbonate, sulphate, tosylate, mesylate, ethane sulphonate, besylate, closilate, camsylate, nosylate, brosylates, dansylate, sulphite, chloride, bromide, iodide, tetrachloroferrate (II), tetrachloroferrate (III), tetrachlorocuprate (II), tetrachlorozincate, tetrachlorocobalate (II), and tetrachloroaluminate,

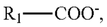 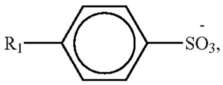 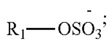

and wherein:

x is CH or N;

y is $CH_2$, O or S;

$Z^-$ is —$COO^-$, —$SO_3^-$, or —$OSO_3^-$; and $R_1$ and $R_2$ are identical or different and are each H, $C_1$-$C_{26}$-alkyl, or $C_1$-$C_{26}$ cycloalkyl.

17. The system of claim 9, wherein the application mechanism is a fire extinguisher.

* * * * *